United States Patent [19]
Veeneman et al.

[11] Patent Number: 5,500,514
[45] Date of Patent: * Mar. 19, 1996

[54] METHOD AND APPARATUS FOR GENERATING GIFT CERTIFICATES

[75] Inventors: William J. Veeneman, Minneapolis; Karla J. Alexander, Minnetonka; Thomas J. Doyle, Minneapolis; Phillip R. Brooks, Eagan; Robert H. Hamilton, Edina, all of Minn.

[73] Assignee: The Gift Certificate Center, Minneapolis, Minn.

[*] Notice: The portion of the term of this patent subsequent to Sep. 7, 2010, has been disclaimed.

[21] Appl. No.: 7,007

[22] Filed: Jan. 21, 1993

Related U.S. Application Data

[63] Continuation-in-part of Ser. No. 760,875, Sep. 16, 1991, abandoned, which is a continuation-in-part of Ser. No. 664,930, Mar. 5, 1991, Pat. No. 5,243,174.

[51] Int. Cl.⁶ ..................................................... G06K 7/08
[52] U.S. Cl. ............................................................ 235/381
[58] Field of Search .................................... 235/379, 381, 235/385, 432, 3; 902/18, 21, 36; 101/DIG. 44; 186/37; 222/2

[56] References Cited

U.S. PATENT DOCUMENTS

| | | | |
|---|---|---|---|
| 1,923,478 | 8/1933 | Drummond | 101/DIG. 44 |
| 2,368,526 | 1/1945 | Deutsch | 235/3 |
| 3,943,335 | 3/1976 | Kinker et al. | 902/21 |
| 4,134,537 | 1/1979 | Glaser et al. | 902/21 |
| 4,359,631 | 11/1982 | Lockwood et al. | |
| 4,385,285 | 5/1983 | Horst et al. | 902/18 |
| 4,671,512 | 6/1987 | Bachman et al. | 902/36 |
| 4,728,377 | 3/1988 | Gallagher | 359/15 X |
| 4,809,837 | 3/1989 | Hayashi | 194/205 |
| 4,982,346 | 1/1991 | Girouard | 235/383 |
| 5,010,485 | 4/1991 | Bigari | 902/22 |
| 5,014,212 | 5/1991 | Smith | 235/432 |
| 5,128,779 | 7/1992 | Mallik | 359/2 |

FOREIGN PATENT DOCUMENTS

| | | | |
|---|---|---|---|
| 0114723 | 8/1984 | European Pat. Off. | |
| 0119720 | 9/1984 | European Pat. Off. | |
| 3-86564 | 4/1991 | Japan | 235/381 |
| 2105075 | 3/1983 | United Kingdom | 235/381 |
| 8501373 | 3/1985 | WIPO | |
| 8603310 | 6/1986 | WIPO | |
| 8805578 | 7/1988 | WIPO | |

*Primary Examiner*—John Shepperd
*Assistant Examiner*—Thien Minh Le
*Attorney, Agent, or Firm*—Merchant, Gould, Smith, Edell, Welter & Schmidt

[57] ABSTRACT

An electronic gift certificate dispenser device for printing and dispensing a gift certificate purchased by a credit card. A consumer approaches the device and inserts a credit card into a magnetic card reader. The consumer chooses a retailer from a menu of participating retailers and enters the gift certificate value. The machine automatically verifies the credit card, causes the account to be debited and prints the gift certificate. A plurality of gift certificate dispensing devices can be connected in a network under the control of a central processing unit. Information regarding gift certificate purchases is transferred from the devices to the central processing unit to be collated and billed to credit card accounts. The central processing unit also informs merchants of the purchase of gift certificates that will be redeemed at their stores.

3 Claims, 21 Drawing Sheets

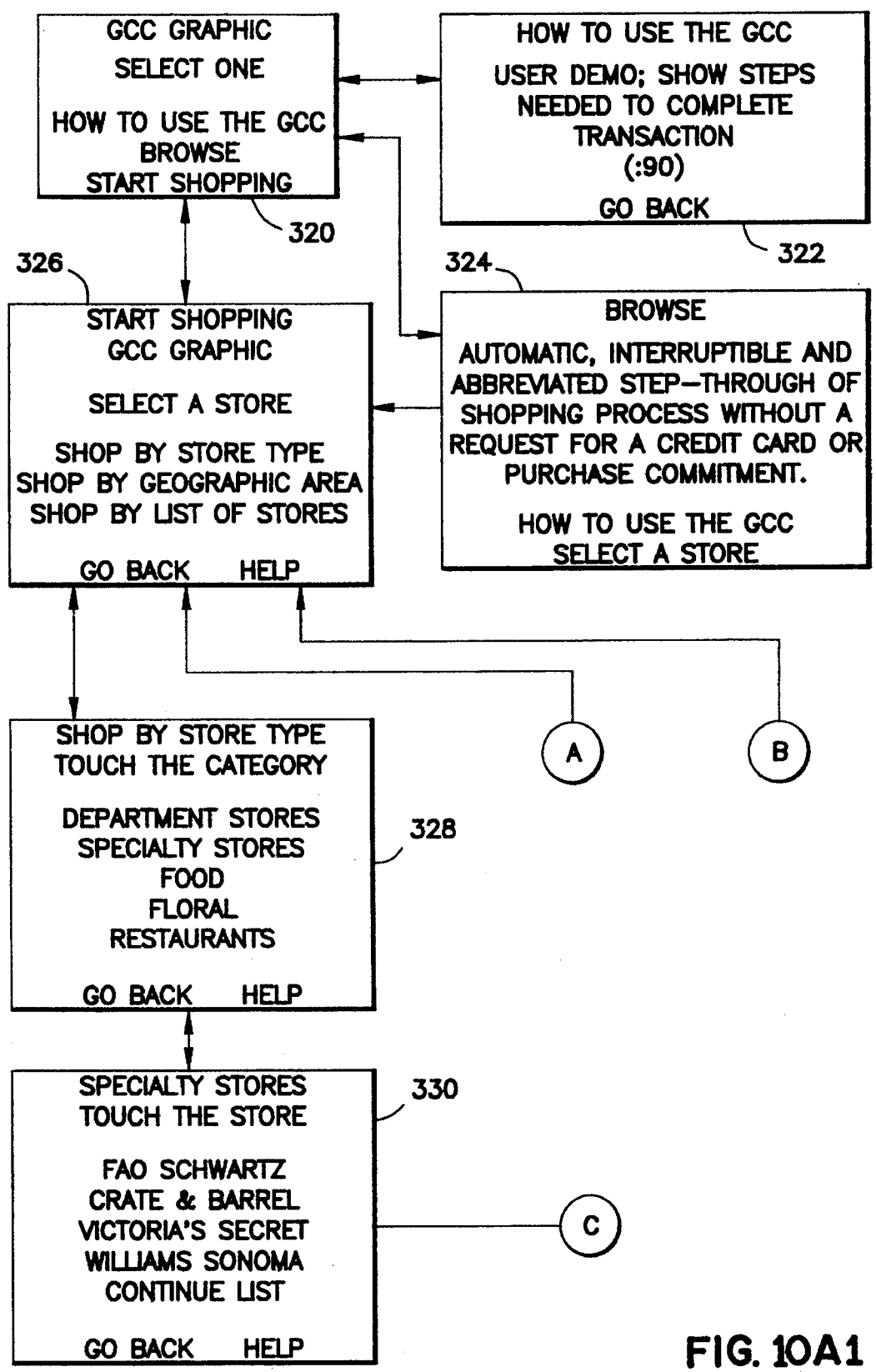
FIG. 10A1

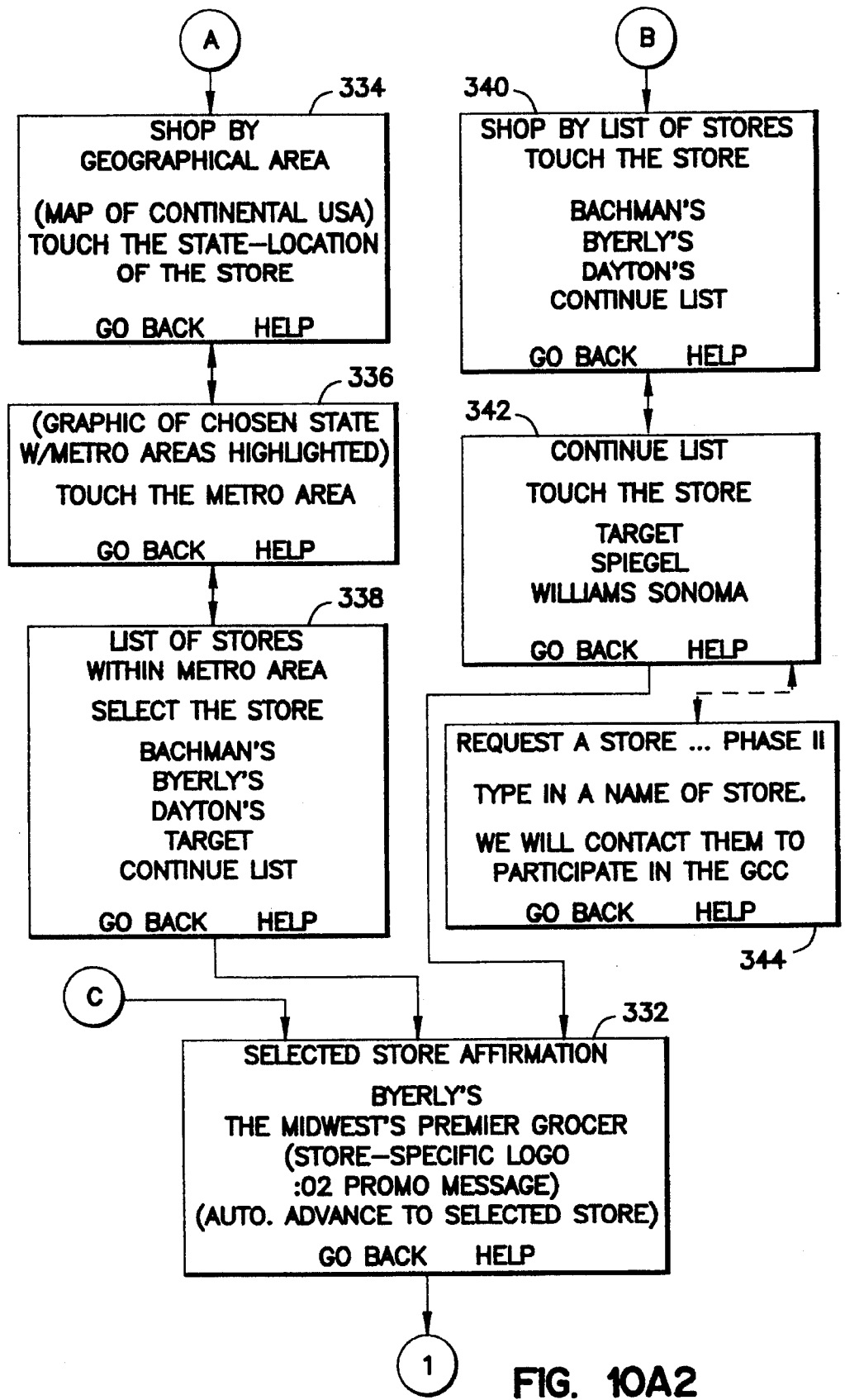
FIG. 10A2

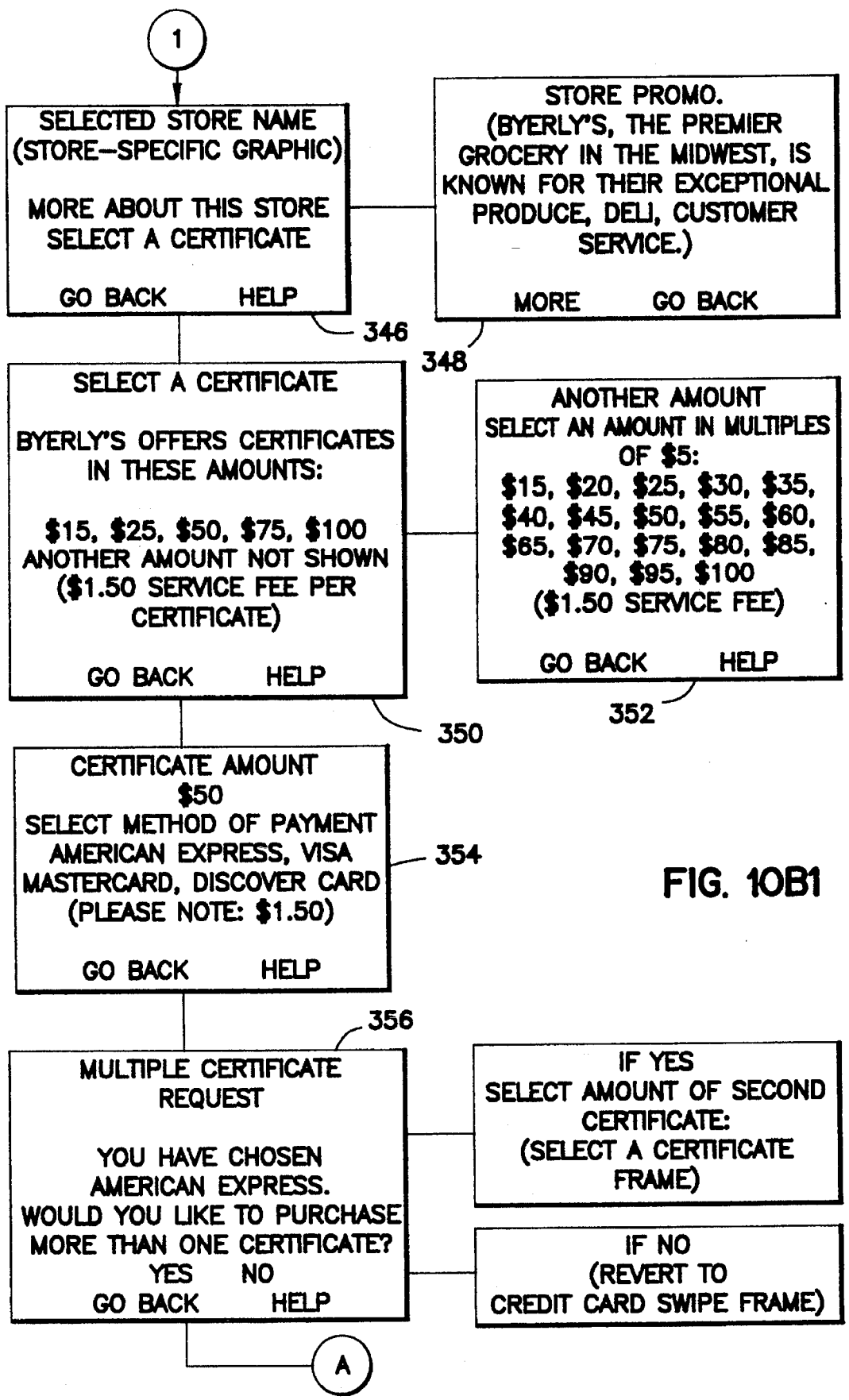
FIG. 10B1

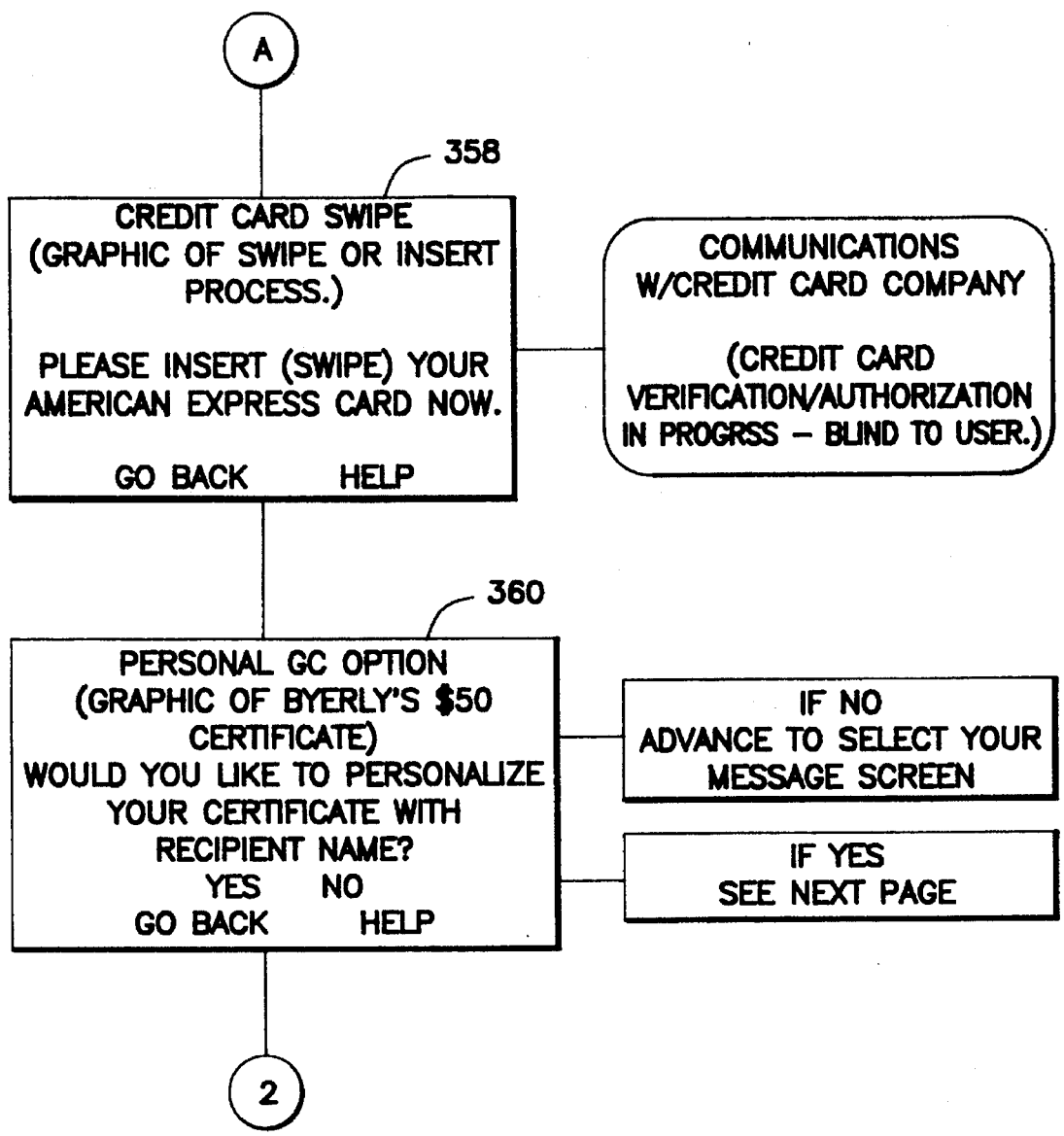
FIG. 10B2

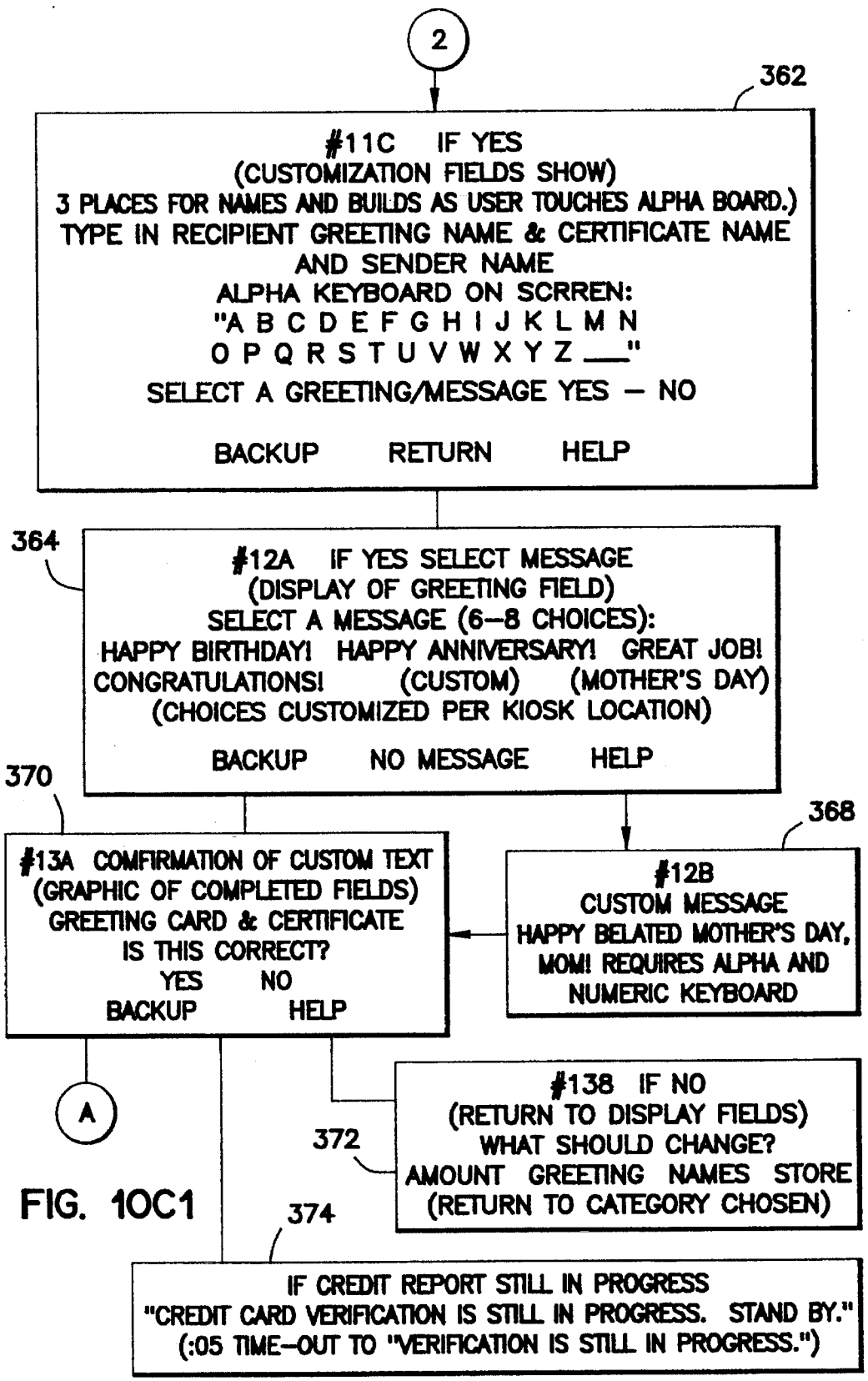
FIG. 10C1

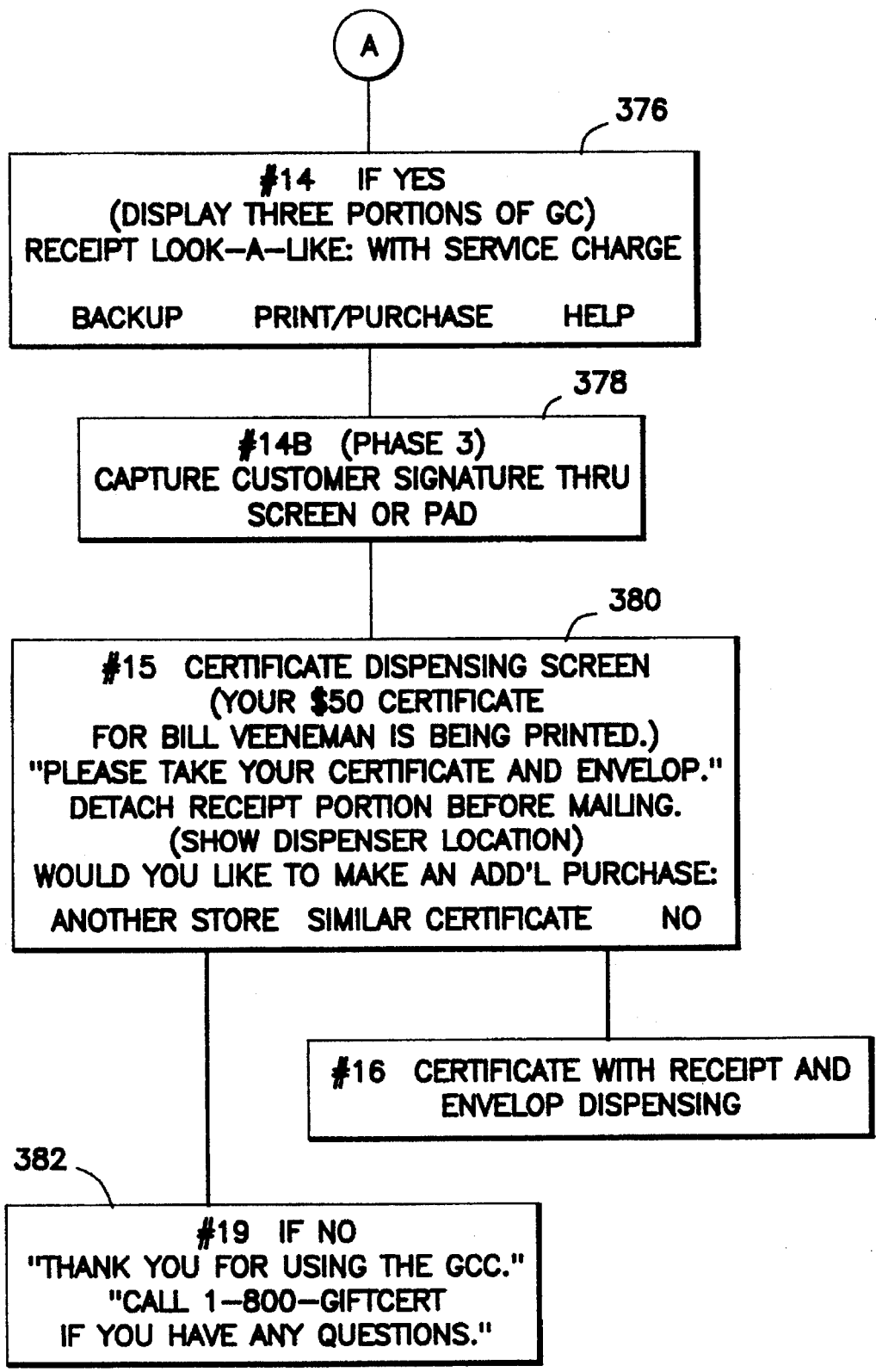
FIG. 10C2

390 — (SHOULD INCLUDE VISUALS OF RETAILER'S LOGOS, COMPLETED CERTIFICATES)
TOUCH HERE TO BEGIN

392 — (DEMONSTRATION OF USER COMPLETING TRANSACTION)
TOUCH HERE TO BEGIN

394 — (SHOW SATISFIED RECIPIENT RECEIVING AND REDEEMING CERTIFICATE)
TOUCH HERE TO BEGIN

396 — (STATEMENT ABOUT $1.50 SERVICE FEE, VISUAL OF CUMULATING CHARGES ON RECEIPT AS A DETACHABLE PART OF THE CERTIFICATE)
TOUCH HERE TO BEGIN

398 — (OPTION TO CREATE SAMPLE CERTIFICATE WITHOUT COMMITTING TO A PURCHASE)
TOUCH HERE TO BEGIN

FIG. 11

METHOD AND APPARATUS FOR GENERATING GIFT CERTIFICATES

BACKGROUND OF THE INVENTION

This is a continuation-in-part of application Ser. No. 07/760,875, filed Sep. 16, 1991, now abandoned which is a continuation-in-part of application Ser. No. 07/664,930, filed on Mar. 5, 1991 now U.S. Pat. No. 5,243,174.

FIELD OF THE INVENTION

The present invention relates to an apparatus and method for dispensing certificates to be used for obtaining goods or services, and more particularly to an apparatus and method for vending such certificates from terminals in communication with a central processing mechanism.

BACKGROUND OF THE INVENTION

Due to increasing time constraints in the lives of busy people, certificates for use in obtaining goods or services have emerged as a viable alternative to the purchase of a gift. Certificates used as gift certificates offer many advantages over the purchase of a gift. If the gift giver is unsure of the needs of the recipient, a gift certificate offers a wide range of goods or services from which the recipient can choose. Gift certificates also remove the hassle of exchanging a gift without a receipt.

Currently gift certificates can be purchased only at retail locations or through catalog houses. This makes the purchase of a certificate less convenient and, therefore, reduces its value to the consumer.

A similar convenience problem was recognized and addressed in the banking industry. One of the solutions was the development of Automatic Teller Machine (ATM) devices. ATMs have become popular for handling simple repetitive transactions such as the dispensing of currency. The widespread acceptance of ATMs has created an educated consumer willing to conduct transactions through a vending device accessed by a credit card.

A similar type of device has been applied to the airline ticketing industry. U.S. Pat. No. 4,818,854, issued to Davies et al. discloses an automatic ticket handling machine used for vending airline tickets. The consumer approaches the machine, inserts a credit card into the card reader, enters a ticketing request through a touch screen and receives a printed ticket. The machine automatically verifies the credit card and debits the account.

The certificate industry has special requirements that make development of an automatic transaction machine difficult. Certificates are similar to currency in their ease of use and anonymity. Steps must be taken to prevent the use of stolen credit cards in the procurement of certificates and to secure paper stock to make forging of certificates difficult.

It is apparent that there is a need for a device that can dispense gift certificates while maintaining a high level of security.

SUMMARY OF THE INVENTION

The present invention provides a device incorporating in a housing mechanism for printing on and dispensing a certificate, as well as mechanism for receiving payment for the certificate. The device also includes a programmable computer under user control which is in communication with the printing and dispensing mechanism and the payment receiving mechanism. The computer includes program steps for receiving from the user a selected amount for the certificate and preparing for printing the amount on a first section of the certificate. The program also includes steps for calculating a cost transaction from the user selected amount wherein the cost of transaction is an incremental service charge greater than the user selected amount. The program further includes steps for preparing for printing a receipt including at least the cost of transaction on a second section of the certificate. The computer then provides for verifying that payment has been received by the payment receiving mechanism and for initiating thereafter printing on the printing and dispensing mechanism. In this way, on receipt of the certificate, the user can separate the second section from the first section as a receipt for the cost paid. The first section is useable as a negotiable certificate for the selected amount for goods and services. Although it is likely the certificate will be given away in the form of a gift certificate, that need not be the case.

According to another embodiment of the present invention, a plurality of devices for printing and dispensing gift certificates are connected to a central processing unit. Each device must establish communication with the central processing unit before it can become operative. At any time after a device becomes operative, it can be rendered inoperative by command from the central processing unit.

According to yet another embodiment of the present invention, a method is disclosed for controlling the selection and printing of gift certificates from a network of gift certificate dispensing terminals connected to a central processing unit.

According to another aspect of the present invention, to discourage credit card fraud each device monitors credit cards used within a predetermined period and limits the total value that can be charged to a credit card within that period to a predetermined maximum value within that period.

BRIEF DESCRIPTION OF THE DRAWINGS

FIG. 10a is a flow chart representation of the screens that are displayed as a consumer selects a retailer according to the present invention.

FIGS. 10b and 10c are flow chart representations of the screens that are displayed as a consumer selects a gift certificate for a previously selected store according to the present invention.

FIG. 11 is a flow chart representation of the screens that are displayed as a response to a customer selecting the BROWSE option during the "Select a Store" phase according to the present invention.

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments in which the invention may be practiced. Like numerals throughout the several views identify like features, the like numerals being primed in alternate embodiments. It is to be understood that other embodiments may also be possible and may be utilized and structural changes may be made without departing from the scope of the present invention.

Figure 1:
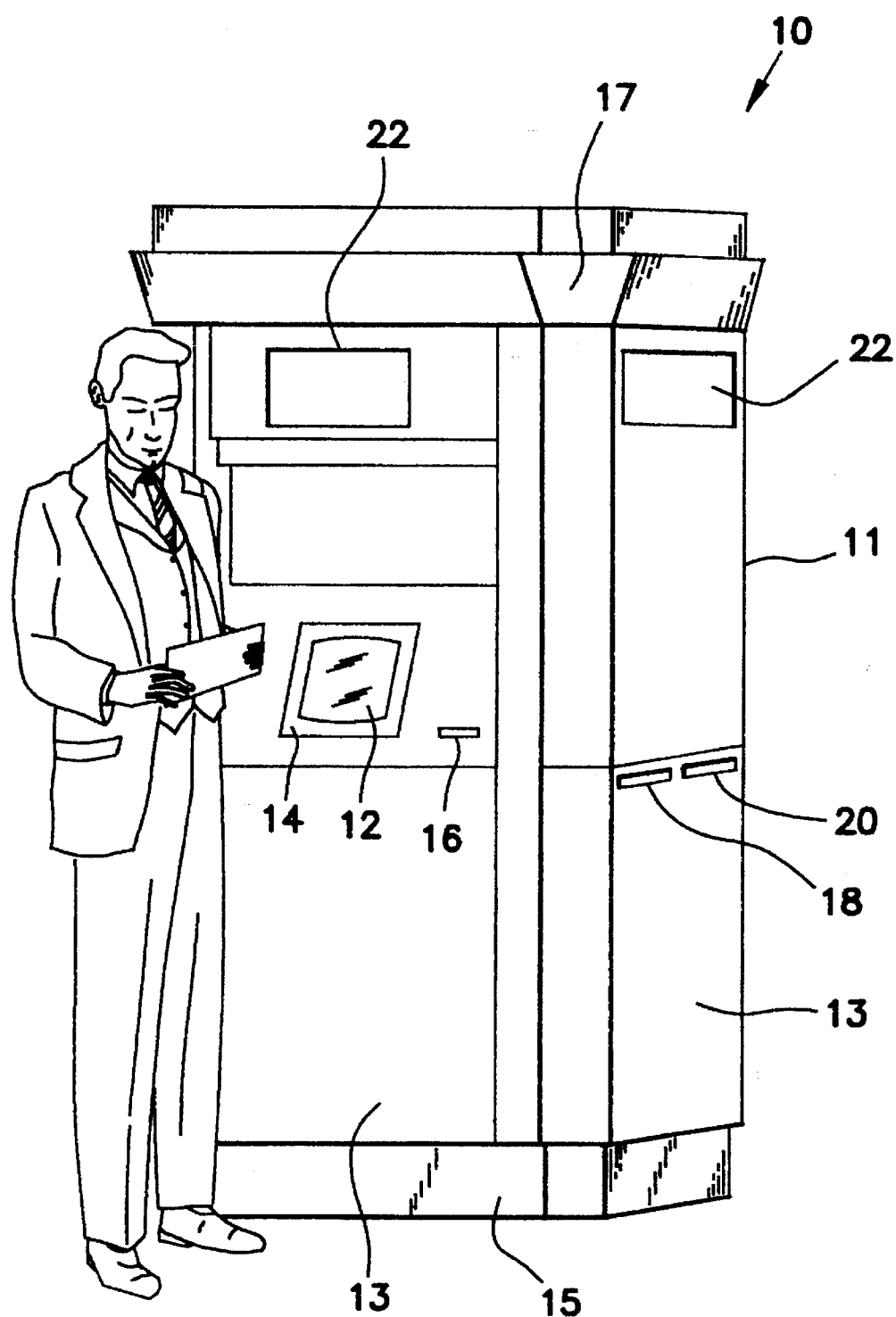
FIG. 1 is a perspective view of a gift certificate dispensing device in accord with the present invention.

An electronic certificate dispensing device 10 is shown in FIG. 1 for dispensing certificates negotiable for goods and services. The present disclosure is directed particularly to a preferred embodiment for dispensing gift certificates. It is understood, however, that the invention as covered by the claims encompasses any certificate as defined in the claims which is negotiable for goods and services. Certificates dispensing device 10 is a stand-alone housing 11 having a rectangular shape with panel-like walls 13, a base 15 and a top 17. Dispensing device 10 houses a monitor 12 with touch screen 14, a magnetic card reader 16, a certificate dispenser slot 18, an envelope dispenser slot 20 and identifying plaques 22 on one or more sides of the device. In the preferred embodiment plaque 22 is made of a backlit translucent material with indicia thereon. Ventilation for the interior of the housing is provided by means of a fan or air conditioner (not shown).

Monitor 12 is used to display choices given to the customer in the purchase of a gift certificate. Choices are made by the customer and entered by touching predetermined areas of touch screen 14. Card reader 16 is used to swipe a credit card in order to debit a credit card account for payment for gift certificates dispensed. It should be noted that although the preferred embodiment is geared toward the use of a credit card it should be obvious that the teaching of the present invention could easily be applied to a debit card system or to a system which accepts cash.

In one embodiment, and as shown in FIG. 1, monitor 12, touch screen 14 and card reader 16 are mounted in a first wall of the housing 11 of device 10. Certificate dispenser slot 18 and envelope dispenser slot 20 are mounted in a second wall of device 10. A customer will approach touch screen 14 in the first wall, enter gift certificate choices, swipe a credit card through card reader 16 and then step to the second wall to await printing and dispensing of the certificate and envelope. This allows a second customer to approach device 10 while the first customer is waiting for his transaction to finish.

In a second embodiment, the plaque 22 positioned over certificate dispenser slot 18 and envelope dispenser slot 20 is replaced by a monitor (not shown) used for displaying messages such as instructions or advertising to a person waiting for a certificate to issue.

In a third embodiment, dispensing device 10 is built into a wall or like structure and covered by one or more panel-like wall portions 13 housing a card reader 16, a certificate dispenser slot 18, an envelope dispenser slot 20 and a monitor 12 with touch screen 14 mounted thereon.

Figure 13:
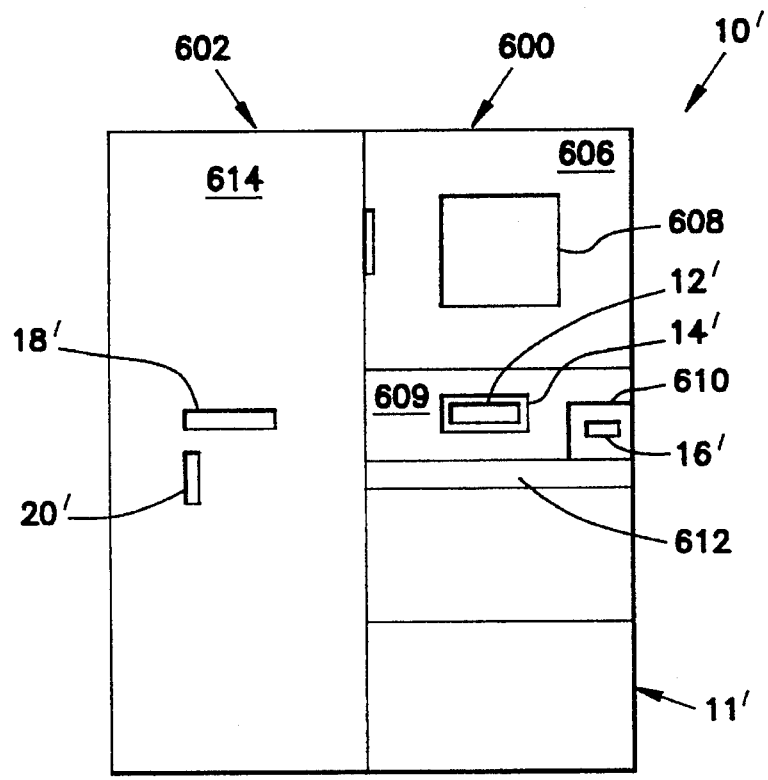
FIG. 13 is a front view of an alternate embodiment of a housing for a gift certificate dispensing device in accord with the present invention.
Figure 14:
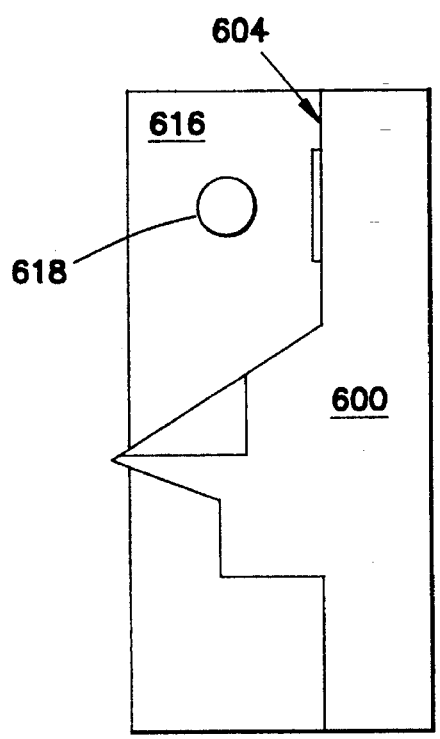
FIG. 14 is a side view of the device in FIG. 13.

In a fourth embodiment, as shown in FIGS. 13 and 14, housing 11' of a device 10' includes a user access subhousing 600 and an electronics mounting subhousing 602. User access subhousing 600 includes a front panel-like wall portion 604 which is separated into a plurality of sections for ease of use by the user, even a user in a wheelchair. Panel-like wall portion 604 includes an upper section 606 having a lighted display 608 therein. An inclined section 608 extends forwardly from section 606 such that the front screen of monitor 12' is mounted in it with touch screen 14' appropriately installed thereto. In an inset portion having a vertical wall 610 with a horizontal surface therebelow, the card reader 16' is mounted with an appropriate receiving slot in vertical wall 610. A section 612 then extends inwardly from the front edge of section 608 to one or more additional sections leading to the bottom of subhousing 600.

The front panel-like wall portion 614, which may also be the electronics access door, of subhousing 602 is essentially vertical. Certificate dispenser slot 18' and envelope dispenser slot 20' are located in panel-like wall portion 614.

Section 606 of wall portion 604 is considerably offset rearwardly from panel-like wall portion 614. There is then a connecting wall 616 appropriate for mounting a speaker 618.

In this way, a user approaches panel-like wall portion 604 and can readily read lighted display 608, operate touch screen 14', activate device 10' with an appropriate card at card reader 16', and be in a good position to listen to any instructions projecting from speaker 618. The sections of wall portion 604 beneath section 612 are sufficiently inset so that a person in a wheelchair can position relative to wall portion 604 adequately so that if the person is otherwise capable, should be able to interact with device 10' as indicated. After an appropriate order has been placed, the person can then move aside from panel-like wall portion 604 to wait for the ordered gift certificate and envelope to be dispensed from gift certificate dispenser slot 18' and envelope dispenser slot 20' in adjacent panel-like wall portion 614.

Figure 2:
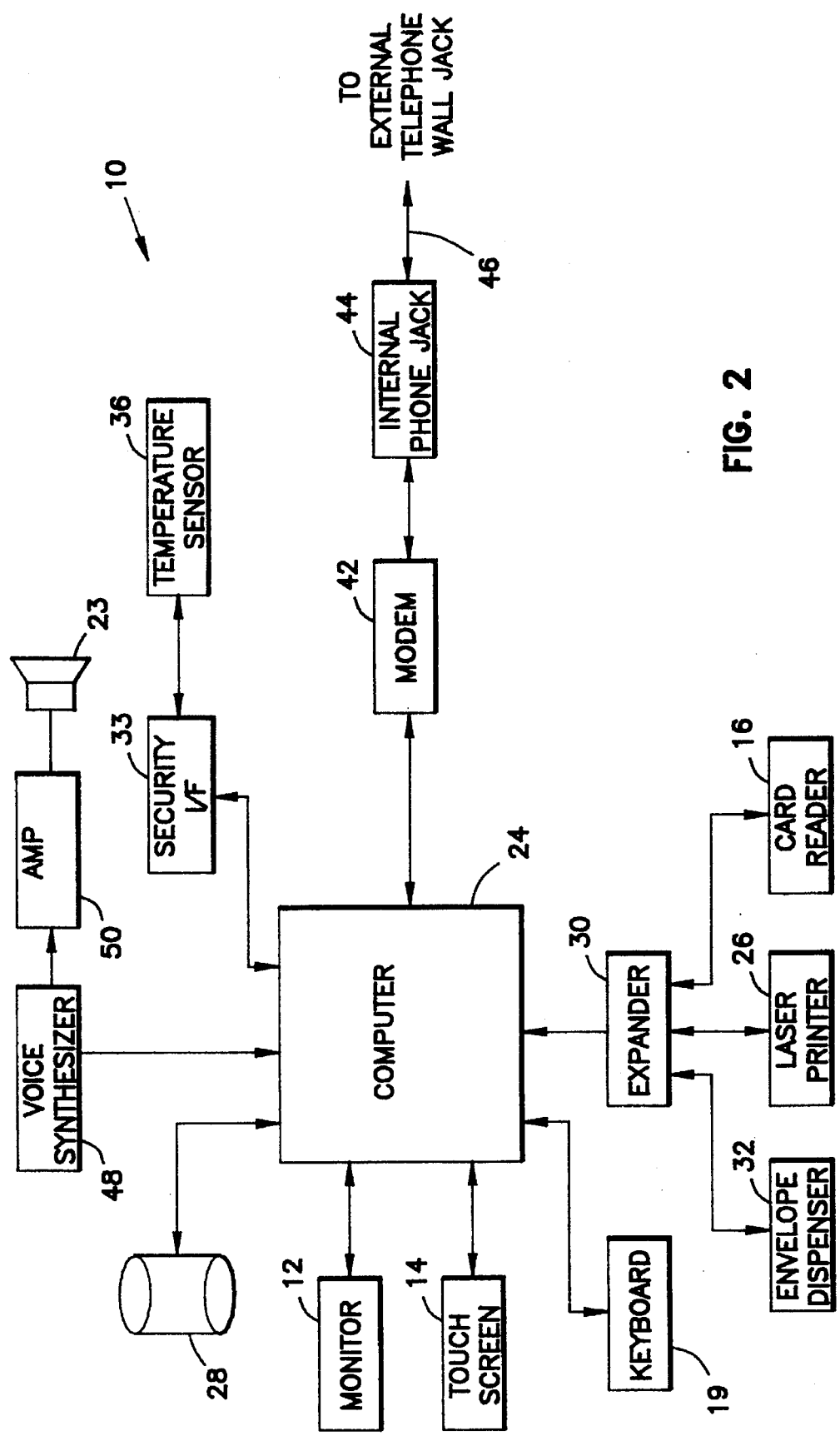
FIG. 2 is an electrical block diagram representation of the gift certificate dispensing device according to the present invention.

The various electronics which provide the advantageous features of gift certificate dispensing device are secured in the housing of the dispensing device. FIG. 2 shows an electrical block diagram of electronic gift certificate dispensing device in accordance with the present invention. Computer 24 is connected to monitor 12, touch screen 14, keyboard 19, nonvolatile memory device 28, expander device 30, security interface 33, modem 42 and voice playback 48. Expander device 30 is connected to envelope dispenser 32, laser printer 26 and card reader 16. Security interface 33 is connected to temperature sensor 36 and various security items (not shown). Expander device 30 and security interface 33 are interface circuits with registers that receive commands from computer 24 and transmit status back to computer 24. Voice playback 48 is connected through amplifier 50 to speaker 23. Voice playback 48 synthesizes voice messages in response to commands received from computer 24. Modem 42 is connected through internal telephone jack 44 to public telecommunications channel 46.

In the preferred embodiment, computer 24 is an IBM PC or compatible computer with at least 2 MBytes of dynamic memory. Monitor 12 is a standard super VGA monitor capable of displaying 640×480 pixels at 256 colors per pixel. Touch screen 14 is an Elographics Intellitouch Model 4001 surface acoustic wave touch screen with touch screen controller. Card reader 16 is a MAGTEX 21055002 slotted magnetic card reader connected to computer 24 through an RS232 line. Laser printer 26 is a Canon LBP4 laser printer. Nonvolatile memory device 28 is a 40 MByte fixed disk drive. Modem 42 is a 2400 Baud MNP Level 5 error correcting modem. Voice playback 48 is manufactured by COVOX. In an alternate embodiment voice playback 48 is replaced by an audio synthesizer capable of creating voice and music from data stored in computer 24. Telephone jack 44 is a standard jack compatible with a standard domestic telephone cable. All these items are commercially available as is known to those skilled in the art.

Card reader 16 is a typical magnetic card reader used to read coded data stored in a magnetic strip on a credit or debit card. Credit cards and debit cards typically have information such as the account name, the account number and the expiration date of the card encoded and deposited on their magnetic strip. Card readers such as card reader 16 contain circuitry which reads the encoded data and sends that data to computer 24 for use in validating the card.

Figure 3:
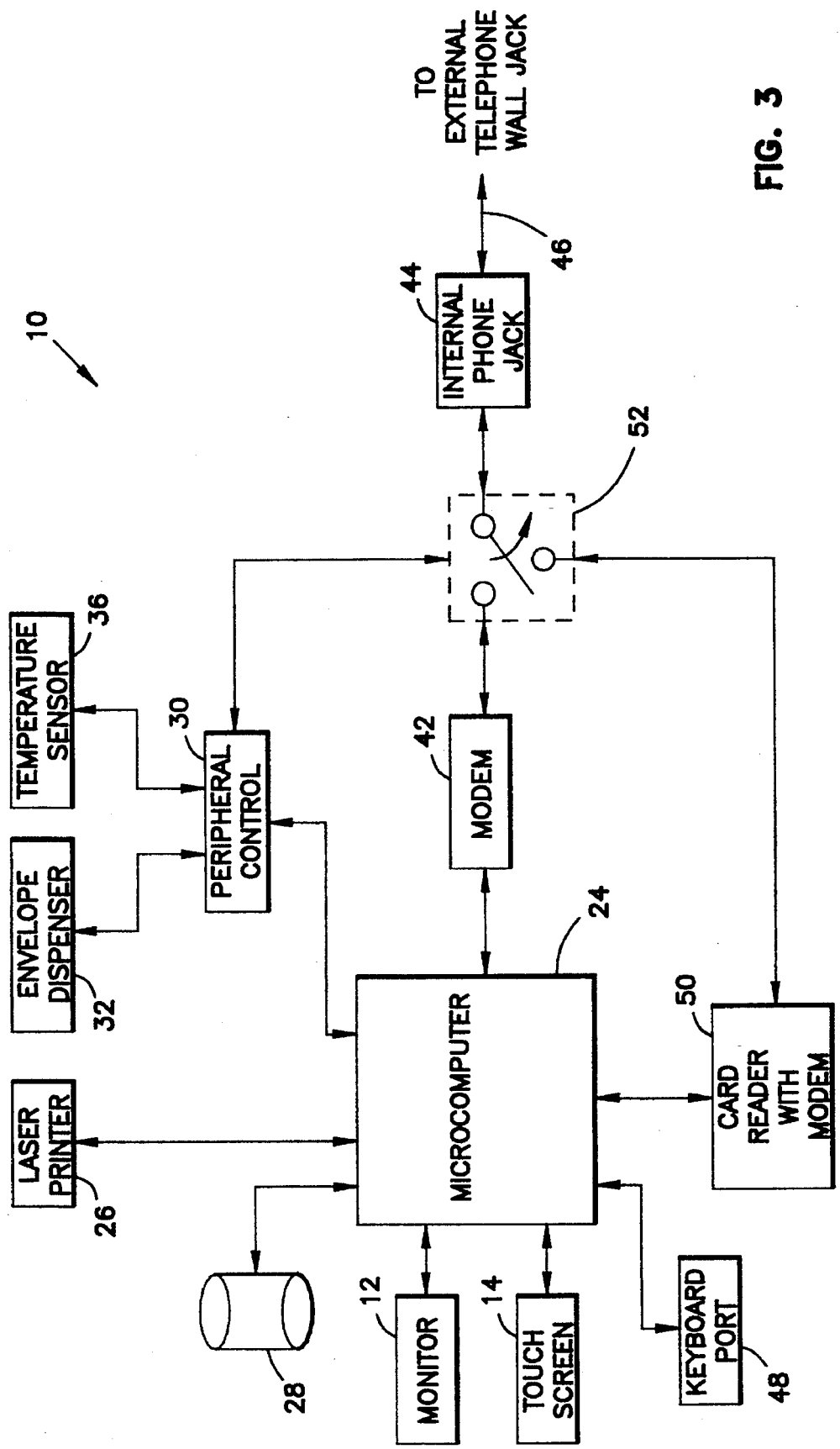
FIG. 3 is an alternative electrical block diagram representation of the gift certificate dispensing device according to the present invention.

An alternate embodiment of the electronics of a gift certificate dispensing device 10 is shown in FIG. 3. In FIG. 3 a card reader 50 with integral modem is used to automatically dial a credit card service for verification of a credit card passed therethrough. A telephone switch 52 under control of peripheral control device 30 connects the modem in card reader 50 to public telecommunications channel 46. This embodiment offloads some of the processing required by computer 24 at the cost of a more expensive card reader and some commercially available switching logic. The embodiment shown in FIG. 3 does not have the voice synthesizing circuitry shown in FIG. 2. Although tests have shown a synthesizer effect between the screen displays on monitor 12 and the voice messages generated by playback 48, a design decision may be made to remove the synthesizer circuitry to reduce system cost. All other electronics are the same as in FIG. 2.

In yet another alternate embodiment (not shown), a second monitor, a second touch screen and a second card reader are mounted on the wall 13 opposite monitor 12. The second monitor, the second touch screen and the second card reader are connected to computer 24 such that a second terminal is provided for selecting and printing gift certificates. Computer 24 controls the operation of both sets of monitors, touch screens and card readers as two separate tasks. Access to common resources such as laser printer 26 and modem 42 is arbitrated by computer 24. Envelopes and printed gift certificates are still dispensed through slots 20 and 18, respectively.

In the preferred embodiment access to the electronics of dispensing device 10 is limited. Only touch screen 14 and card reader 16 are readily accessible to the user. The remainder of the electronics are secured behind the access door.

Also, in the preferred embodiment, temperature sensor 36 mounted inside gift certificate dispensing device 10 measures the ambient temperature within dispensing device 10 and reports that temperature to computer 24. If the measured ambient temperature rises above 85 degrees Fahrenheit computer 24 automatically shuts down the electronics of device 10 to avoid damage to electronic components.

Gift certificate dispensing device 10 can operate independently or within a network. Networked operation of the dispensing devices is preferred since it eases the requirement for local security. In the preferred embodiment a number of gift certificate dispensing devices 10 are connected by telephone to a main computer. The main computer can poll dispensing devices to determine if a dispensing device has been disconnected or has lost power, can execute diagnostic tests remotely to expedite detection of hardware failure and can monitor devices for unauthorized access or vandalism.

Figure 4:
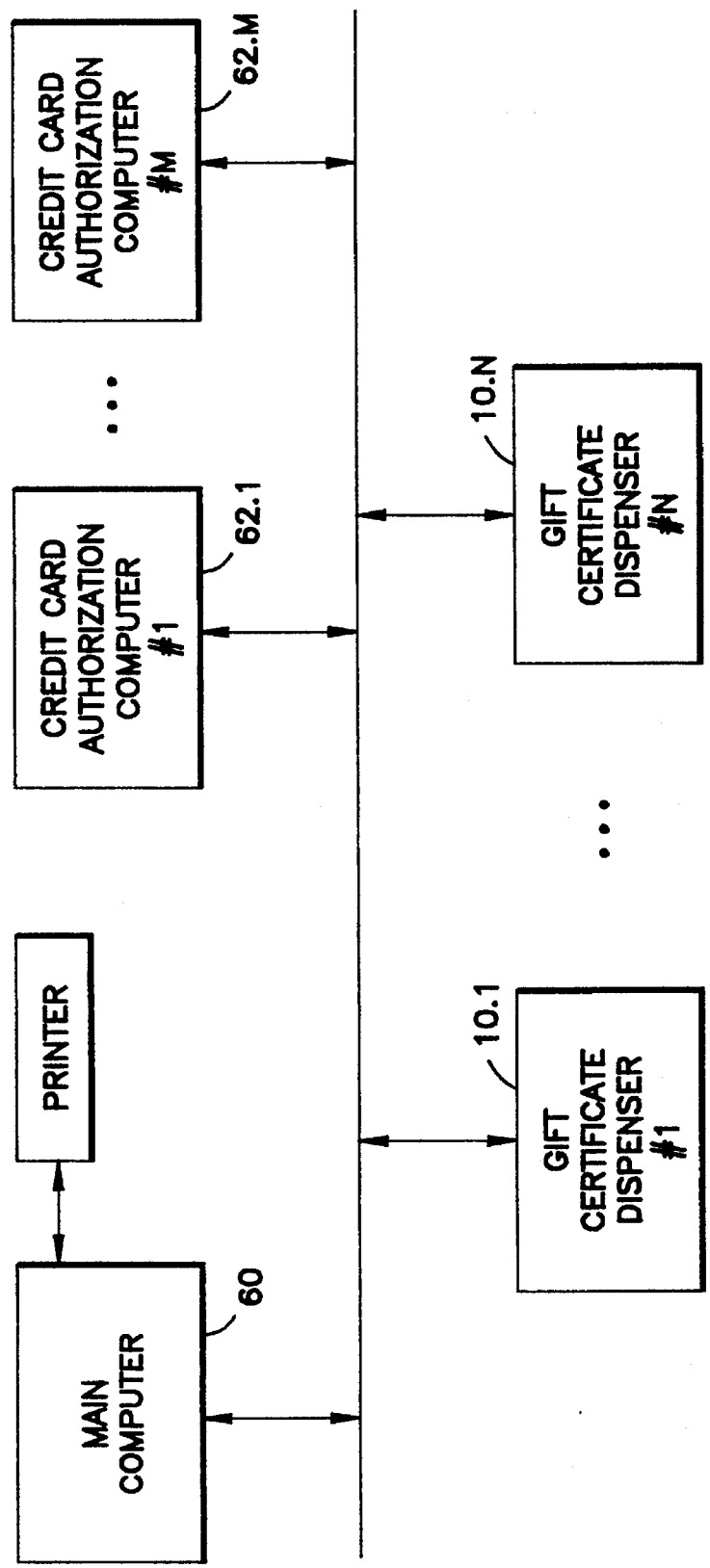
FIG. 4 is a block diagram representative of a network of gift certificate dispensing devices coordinated by a main computer and one or more credit card authorization computers according to the present invention.

FIG. 4 is a block diagram representative of a network of gift certificate dispensing devices 10 coordinated by a main computer. In FIG. 4, gift certificate dispensing devices 10.1 through 10.N are connected through public telecommunications channel 46 to main computer 60. Transactions entered at one of the devices 10 are transmitted to computer 60 over channel 46. Computer 60 in turn accesses one or more credit card authorization computers 62.1 through 62.M through channel 46 to receive credit card authorization. Authorization is then granted by computer 60 to the appropriate dispensing device 10.

Computer 60 is connected to a printer 64 for printing transactions either as they occur or as a batch at predetermined time intervals. In the preferred embodiment computer 60 is a PC compatible computer. Purchases made through gift certificate dispensing devices 10.1 through 10.N are accumulated in computer 60. Requests for payment (debits to credit card accounts) for those purchases are either submitted electronically through public telecommunications channel 46 to computer 62 or submitted as a bill printed from printer 64. In a like manner, merchants are notified of purchases of gift certificates issued in their name and of the code numbers of the certificates issued either through channel 46 or through a report printed by printer 64.

Steps have been taken to ensure secure operation of gift certificate dispensing devices 10. In the preferred embodiment, device 10 powers up inoperative. In order to become operative, it must establish communication with computer 60, download a unique security code and appropriately verify that code.

Figure 6:
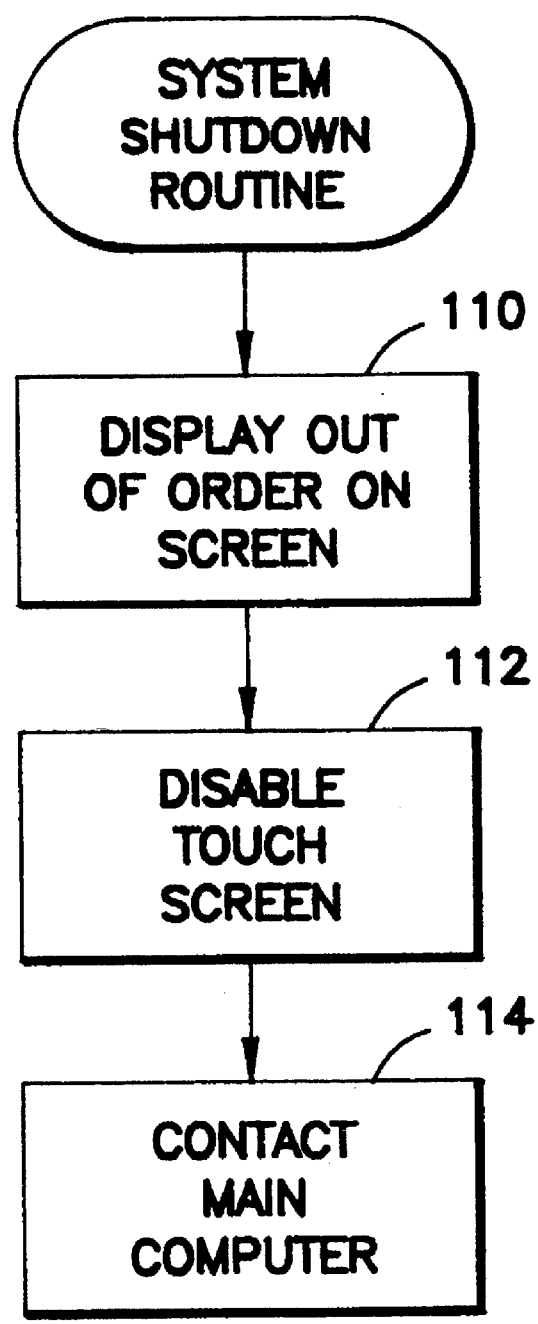
FIG. 6 is a flow chart representation of the steps taken in shutting down the system after a hard failure.

Computer 60 can at any time render any device 10 in the network inoperative by sending it a shut down command. Reception of the shut down command causes a device 10 to destroy sensitive program code and data and enter a special system shut down routine that disables the user interface. A representative system shut down routine is shown in FIG. 6 and described later. This is a useful security feature that can be used to disable a device 10 when computer 60 detects a failure or impending failure.

Gift certificates are printed with an intricate multicolored design on faded parchment paper and embossed with holographic foil. The type of paper, the ink and the amount of detail are chosen to make copying difficult. Embossing the certificate with holographic foil makes counterfeiting more difficult. In the preferred embodiment, the holographic foil may be obtained from and applied by Larkin Industries, St. Paul, Minn.

Figure 12:
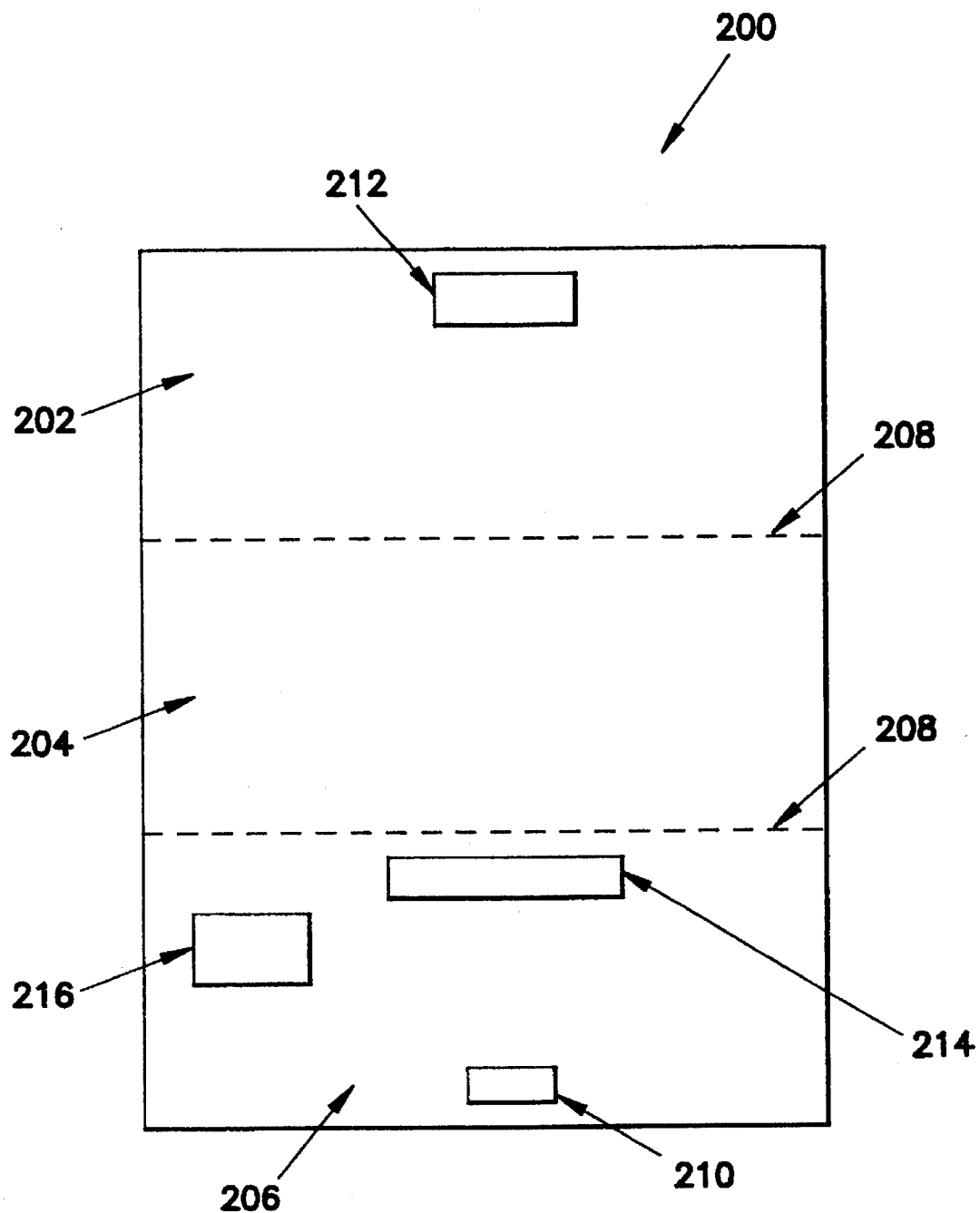
FIG. 12 is a representation of a gift certificate in accord with the present invention.

A representative gift certificate is shown in FIG. 12. Gift certificate 200 is a standard size sheet of faded parchment paper divided into three sections 202, 204 and 206 with perforations 208 for easy separation of the sections. Section 202 is used to print a receipt for the transaction. The name and account number on the credit card is printed along with name of the recipient, the date, the charges for the purchase and the dispensing device 10 from which the certificate was purchased. In the preferred embodiment, a service charge per certificate is included in the total charges. Section 204 is used to display the name of the intended recipient, a message such as "Happy Birthday" or "Thank You" and the name of the purchaser. Section 206 is the section of the gift certificate that is redeemed to purchase merchandise from the intended retailer.

In the preferred embodiment, during production each section 206 is imprinted with a unique control code (not shown) and silver embossed with a hologram 210. The code imprinted is matched to the name of the intended recipient during the sale of the certificate and the code and the name of the recipient are then communicated to the intended retailer. When the certificate is redeemed the code can be compared against a list of expected codes and verified for authenticity. In an alternate embodiment, the control code could be implemented as a bar code that can be scanned with a bar code reader. In another alternate embodiment, the control code could be implemented as a magnetic ink character recognition (MICR) number and used in a fashion as commonly known, particularly in the banking industry.

A logo representative of the company operating the particular gift certificate dispensing device 10 is printed at 212 and 214. A bit-mapped graphic or logo representative of the intended retailer and, if requested, a retailer control code are retrieved from nonvolatile memory device 28 and printed to location 216 of certificate 200 during certificate printing. Retailer logos are obtained by scanning a design provided by the retailer and storing the resulting image to nonvolatile memory device 28.

Purchasers receive certificate 200, remove section 202 for their records and send sections 204 and 206 to the intended recipient. The recipient receives sections 204 and 206, detaches 204 from 206 and redeems section 206 at the designated store.

Rather than purchasers of certificate 200 sending sections 204 and 206 to the intended recipient, dispensing device 10 can include a mechanism for accepting and holding certificate 200 for subsequent delivery to a commercially known mail system, such as the U.S. mail service or some other private commercial publicly known mail system. The mechanism would be under user control and may include issuing the certificate and an envelope to the user who then appropriately places the certificate in the envelope and returns the envelope to the dispenser through a slot or other mechanism. Alternatively, dispensing device 10 could retain the certificate for non-user preparation of it before delivery to a known mail system.

It is understood that certificates need not be three sections as shown for certificate 200. A certificate may be, as well for example, only two sections. The first section would be useable as a negotiable certificate for the selected amount of goods and services. The second section would be separated by a weakened line from the first section and be a receipt for the cost of the transaction. In such a situation, computer 24 would be programmed to include first mechanism for receiving from the user a selected amount for the first section of the certificate and preparing for printing the amount on the first section. The program would also include means for calculating a cost of transaction which would be an incremental amount greater than the user selected amount. The incremental amount would be a service fee as indicated at box 310 in FIG. 9. The program would also include second mechanism for preparing for printing a receipt on the second section of the certificate to include at least the cost of transaction as indicated. Thus, such a certificate when completed would include at least a selected amount for negotiable use for goods and services on the first section of the certificate and a cost of the transaction as a receipt on the second section of the certificate.

Gift certificates are stored in a bonded printer. Only bonded authorized service personnel can obtain paper and install it in the printer. Supplies of paper in each device 10 are checked randomly for integrity.

The value of a certificate 200 cannot exceed a predetermined amount. In addition, each device 10 monitors use of each credit card and prevents charging more than a predetermined limit in a designated time period. In networked systems this protection against credit card abuse can be extended to all gift certificate dispensing devices 10 in the network.

Each certificate is printed with an expiration date to encourage timely redemption. To further enhance security, participating stores are requested to redeem certificates for merchandise only and to request identification while redeeming a certificate.

In use, on receiving power, computer 24 executes a power-on self test. In a PC compatible computer this test is a resident program that is typically executed out of ROM (read only memory). The power-on self test checks system dynamic memory, the system board, nonvolatile memory device 28 and monitor 12. Upon successful completion, computer 24 reads up a portion of its programming from nonvolatile memory device 30 and begins executing a system initialization program. If computer 24 is unable to successfully complete the power-up self test, a message to that effect is displayed on monitor 12 and gift certificate dispensing device 10 is disabled.

Figure 5A:
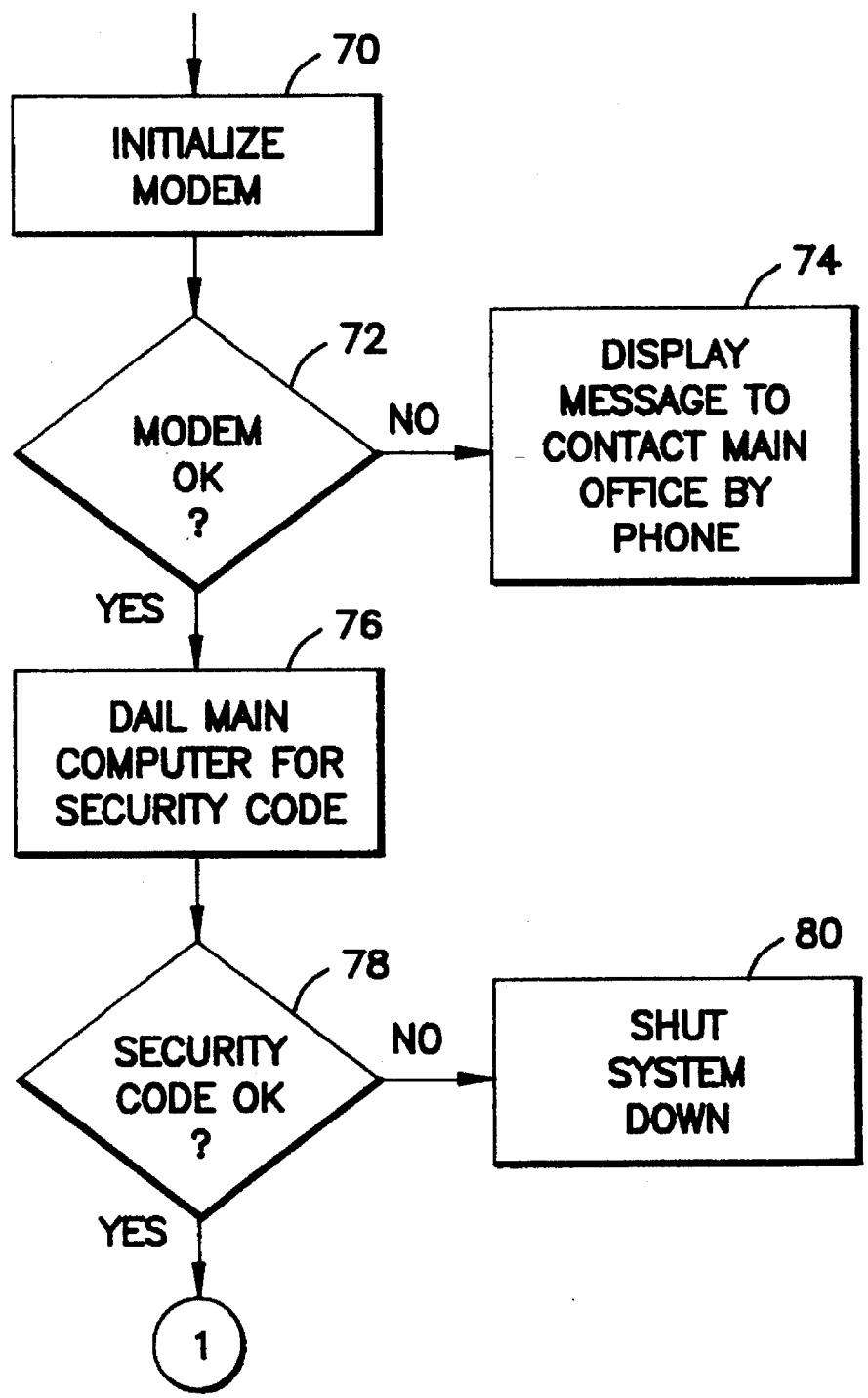
FIGS. 5a and 5b are flow chart representations of the steps taken in initializing the gift certificate dispensing device computer upon power up.
Figure 5B:
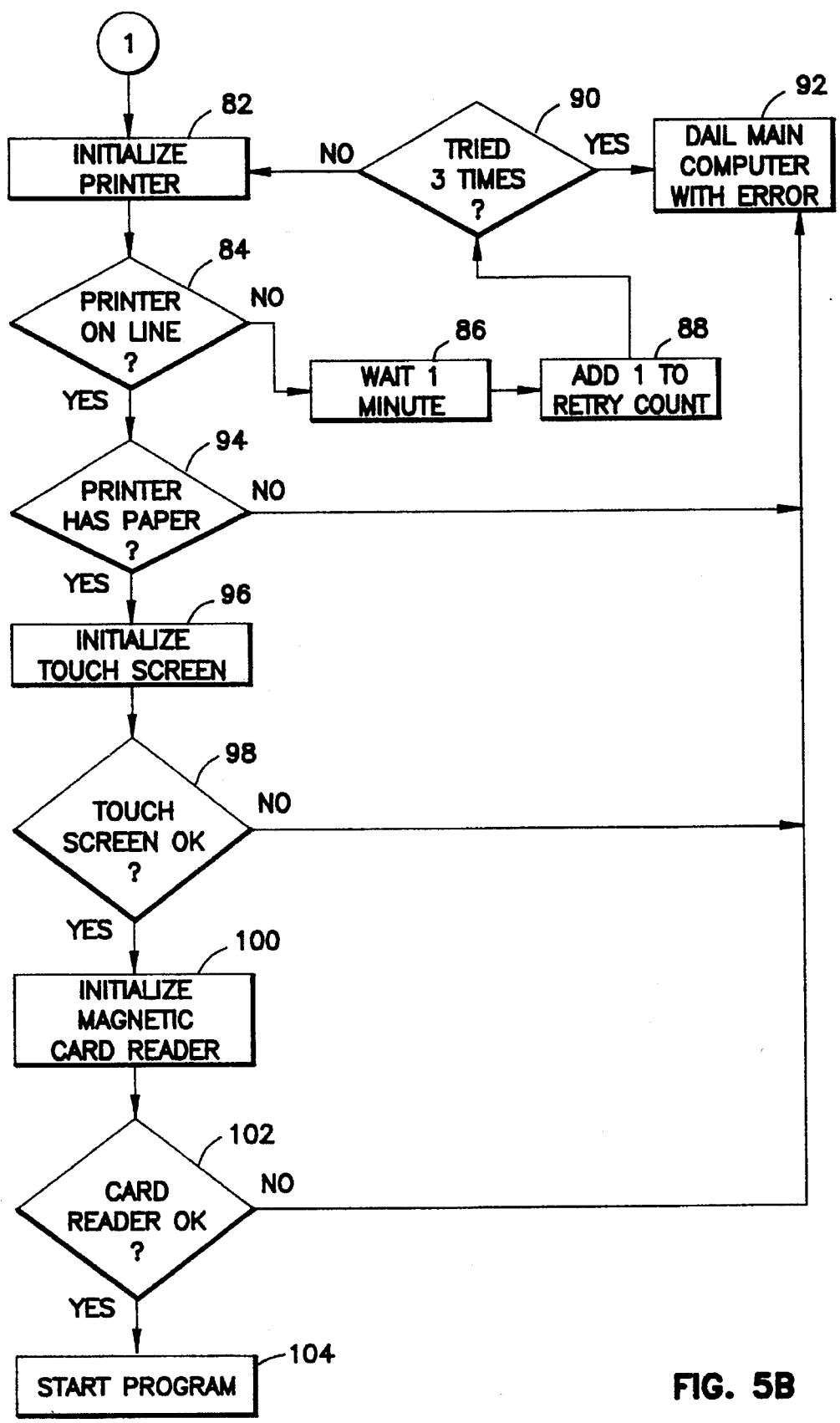

A control flow program representative of a system initialization for the present invention is illustrated in FIGS. 5a and 5b. The routine shown is written for a networked environment. It should be obvious to one skilled in the art that this routine is readily adaptable to independent operation of a gift certificate dispensing device.

The routine is entered at 70 after successful execution of the power-on self test. First, communication is established with main computer 60. At 70 an attempt is made to initialize modem 42. At 72 a check is made to see if the modem is ready. If not, at 74 a message is displayed on monitor 12 detailing the error and requesting service.

If at 72 the modem is found to be ready, at 76 a telephone call is made to main computer 60 and a security code downloaded from computer 60 to computer 24. At 78, the downloaded security code is compared against a code stored on nonvolatile memory device 28. If the two codes match, node security has been verified. Retry count is set to zero and control moves to 82 to initialize laser printer 26. If the two codes do not match, a system shutdown routine is called at 80 to secure the gift certificate dispensing device.

After link security has been verified at 78, at 82 an attempt is made to initialize printer 26. A check is made at 84 to see if printer 26 is ready. If not, at 86 computer 24 executes a one minute wait, at 88 the retry count is incremented and at 90 a check is made to see if the number of initialization attempts equals three. If so, at 92 a telephone call is placed through modem 42 to main computer 60 and the error is logged.

If at 84 printer 26 is determined to be ready, a check is made at 94 to see if printer 26 has blank certificates. If not, control moves to 92, a telephone call is placed through modem 42 to main computer 60 and the error is logged.

If at 94 printer 26 is determined to have a supply of blank certificates, control moves to 96 where touch screen 14 is initialized. At 98 a check is made to see if touch screen 14 is ready. If not, control moves to 92 to log the error. If touch screen 14 is ready, at 100 card reader 16 is initialized and at 102 a check made to see if card reader 16 is ready. If not, control moves to 92 to log the error. If card reader 16 is ready, at 104 the main program is initiated.

On successful completion of the initialization program of FIGS. 5a and 5b, computer 24 enters the main program. The main program will now be described from the standpoint of the user interface.

Figure 9:
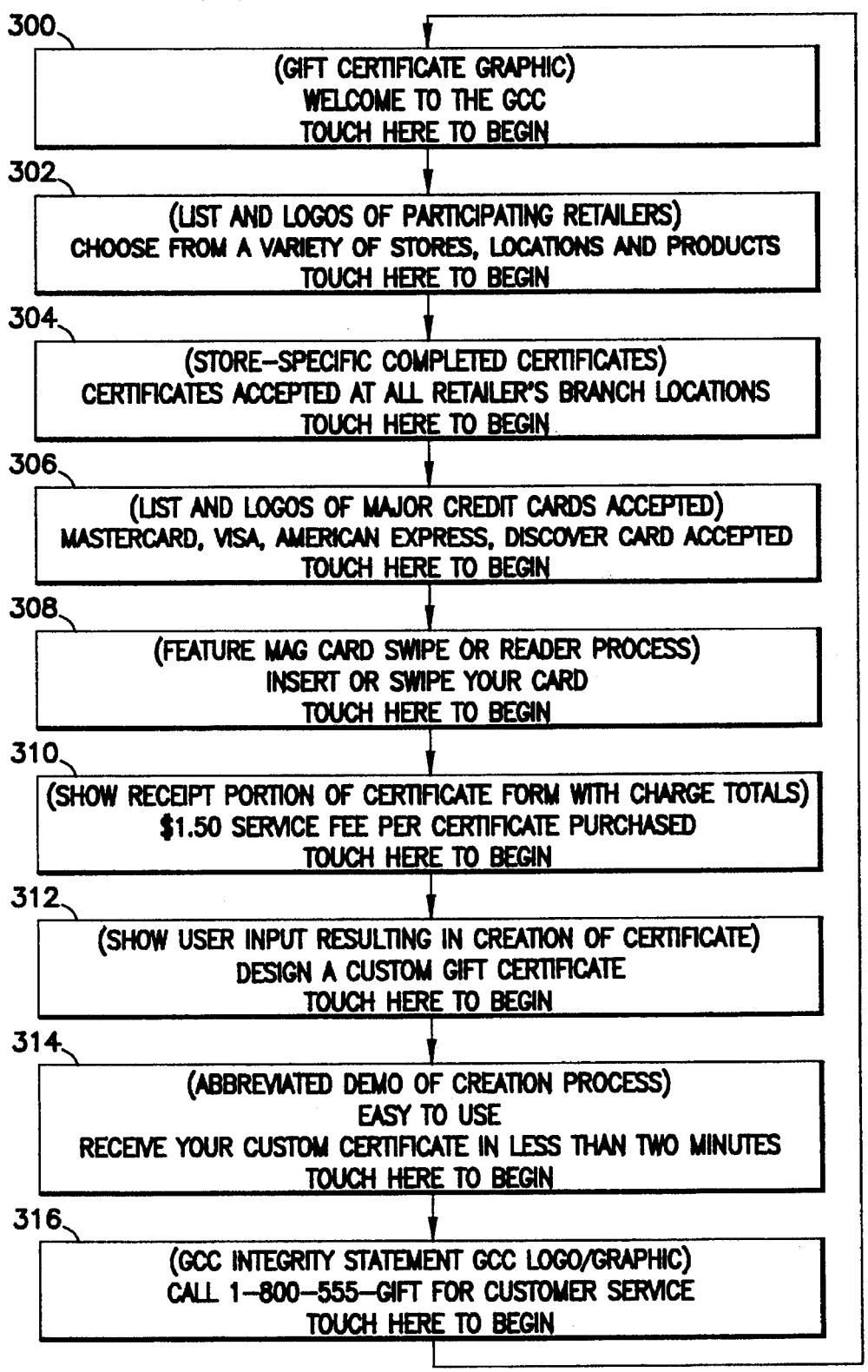
FIG. 9 illustrates a series of representations of the screen images that are displayed according to the present invention to attract consumer attention and to explain the operation of the gift certificate dispensing device.

The following discussion is a description of one embodiment of the screen displays and user interface for a gift certificate dispensing device. It should be understood that logical flows other than that described could be implemented without departing from the spirit and scope of the present invention. In one embodiment, the main program starts with the Attractor module shown in FIG. 9. The Attractor module is an endless loop during which a sequence of display screens is shown on monitor 12. The sequence of display screens is intended to familiarize the consumer with the gift certificate product itself and with the method used to purchase a gift certificate. The loop is terminated by the detection of a touch on touch screen 14. FIG. 9 shows a representative sequence of display screens used while waiting for the touch on touch screen 14. At 300 a welcome screen is displayed. At 302, a list of participating retailers is displayed. At 304, some examples of completed gift certificates are shown. At 306, a list of the types of credit cards that can be used is displayed. At 308, instructions on use of magnetic card reader 16 are displayed. At 310, transaction charges are explained. At 312, a graphic demonstrating design of a custom gift certificate is displayed. At 314, a graphic illustrating the printing and dispensing of a gift certificate is displayed. And at 316, a graphic describing the company that owns the particular gift certificate dispensing device is displayed (in this case the company is THE GIFT CERTIFICATE CENTER, INC. or GCC). The routine continues scrolling through screens 300 through 316 until a touch is detected on touch screen 14.

In the preferred embodiment, a combination of voice and screen messages is used to guide the customer in a purchase. Once a touch is detected, control moves to the routine shown in FIG. 10a. FIG. 10a illustrates the sequence of screen displays shown while choosing the retailer to be shown on the purchased gift certificate. The routine is entered at 320 where a screen is displayed with clearly marked areas labeled "How to use the GCC", "Browse" and "Start Shopping". At the same time a welcoming message is broadcasted over speaker 23. Computer 24 then waits for a selection made by touching within the marked areas on touch screen 14. At 320, as in the remaining screens of FIGS. 10a through 10c, if no touch is detected within a first predetermined period a prompt such as "Please touch the screen to continue" is displayed on monitor 12. A second predetermined period is allowed to pass. If no touch is detected yet, a prompt such as "Please make your selection now" is displayed. Then if no touch is detected within a third predetermined period, control reverts to the Attractor module shown in FIG. 9.

If, at 320, the area labeled "How to use the GCC" is touched, control moves to 322 where a short demonstration of the steps needed to complete the purchase of a gift certificate is shown. At any time during that demonstration a touch on the area of the screen marked "Go Back" will terminate the demonstration display and move control back to 320. In any event, after the demonstration concludes, control moves back to 320.

If, at 320, the area labeled "Browse" is touched, control moves to 324 where an abbreviated step-through of the demonstration of 322 is shown. At any time during the step-through a touch on the area of the screen marked "How to Use the GCC" will terminate the demonstration display and control will move to 322. A touch on the area marked "Select a Store" will move control to 326. In any event, after the demonstration concludes, control moves back to 320.

At each step of the purchase, a voice message complementary to the screen display guides the customer in the next decision. If, at 320, the area labeled "Start Shopping" is touched, control moves to 326 where a screen is displayed with clearly marked areas labeled "Shop by Store Type", "Shop by Geographic Area", "Shop by List of Stores", "Go Back" and "Help." At the same time, a voice message is broadcast telling the customer the next step in the purchase. The merchant named on the gift certificate can be chosen by category, by geographical locations served or from a list of retailers who serve the local area. The "Go Back" label is provided on a majority of screens to allow users to retrace their steps through the screen displays. The "Help" label is provided to call a series of "Help" screens (not shown) for additional instructions. If an Attractor module is not used, the main program can start at 326.

If, at 326, the area labeled "Shop by Store Type" is touched, control moves to 328 where a screen is displayed with clearly marked areas labeled by category. A touch within one of the marked areas moves control to 330 where a list of stores within that category is displayed. A touch on a retailer from the list of stores in 330 moves control to 332 where short store-specific promotional messages are displayed and broadcasted and then the program moves to 346.

If, at 326, the area labeled "Shop by Geographic Location" is touched, control moves to 334 where a map of the states of the continental United States is displayed. A touch within one of the states moves control to 336 where a graphical representation of the state is displayed with metropolitan areas highlighted. A touch in an area highlighted as a metropolitan area moves control to 338 where a list of the stores that serve that metropolitan area is displayed. The stores listed may be stores located in that area or stores that provide a mail-order service for that area. The list is displayed such that a touch on touch screen 14 in the vicinity of a retailer on the list selects the retailer and moves control first to 332 where a short store-specific promotional message is displayed and then to 346.

In an alternate embodiment, a list if cities within the state is displayed. A touch of the area around the city name selects the city and moves control to the store list.

If, at 326, the area labeled "Shop by List of Stores" is touched, control moves to 340 where a screen is displayed with list of stores that serve the immediate metropolitan area. When the list is too large to fit on one display screen the consumer can scroll down the list by touching the area marked "Continue List" and moving to 342. At 342, the consumer can also scroll back up the list (and move back to 340) with the "Go Back" command. A touch within the vicinity of one of the stores on the list in either 340 or 342 selects the store. Control moves to 332 for the display of a short promotional message related to the selected store prior to moving to 346.

In an alternate embodiment, a screen display 344 is provided to provide customer feedback. The screen displays of 340 and 342 would include a marked area labeled "Request a Store". A touch in the vicinity of "Request a Store" causes the program to move to 344 where the customer can enter the name of the desired store through touch screen 14 using a keyboard displayed on monitor 12.

Once a store has been selected control moves to 346 as shown in FIG. 10b to complete the purchase. At 346 a screen is displayed with clearly marked areas labeled "More about this Store" and "Select a Certificate". Computer 24 then waits for a selection made by touching within the marked areas on touch screen 14. Selection of the area marked "More about this Store" takes the program to 348 where a longer promotional message related to the selected store is displayed. This message may include information on products and services and on current sales promotions. In the preferred embodiment, on conclusion of the promotional message control moves back to 346.

If, at 346, touch screen 14 is touched in the area marked "Select a Certificate", control moves to 350. At 350 a screen is displayed listing the types of certificates offered by the selected store. In the preferred embodiment, certificates can be issued for goods, services or monetary value. The item chosen is printed as text or as a graphical representation of that item to section 206 of certificate 200 in FIG. 12. Since more than one certificate can be purchased at one time, a separate window is displayed on monitor 12 showing charges accumulated so far in the transaction. The customer chooses the type of certificate desired by touching in the vicinity of a label from a group of labels including monetary values and available goods and services. If the desired monetary values are not displayed, the customer can select the label marked "Another amount not shown". Control then moves to 352 and other values can be selected. Once a value is selected at 350 or 352, control moves to 354 in order to charge the purchase to a credit card.

At 354 a list of accepted credit cards is displayed. The customer selects the form of payment and at 356 computer 24 displays the form of payment selected and the question "Would you like to purchase more than one certificate?". If at 356 the answer is "Yes", the data corresponding to the previous certificate selected is saved and control moves to 350 so that additional certificates can be purchased. If the answer is "No", control moves to 358.

Although FIG. 10B and the present description relates to use of a credit card, it is understood that the credit card reader could be replaced by a paper money reader and that payment could be made with paper money. It is further understood that the service fee as indicated at 310 and also at 354 is used in a calculation performed by a program run by computer 24 to calculate the cost of the transaction which is an incremental amount (a service fee of $1.50 is shown in the figures) greater than the value chosen for the certificate by the user.

In the case of dispensing device 10 accepting cash in the form of paper money, the program run on computer 24 could include mechanism for showing on the display the cost of the transaction and the sum remaining to be paid so that as cash is received, the sum changes and continues to show the user how much remains to be paid.

Figure 8:
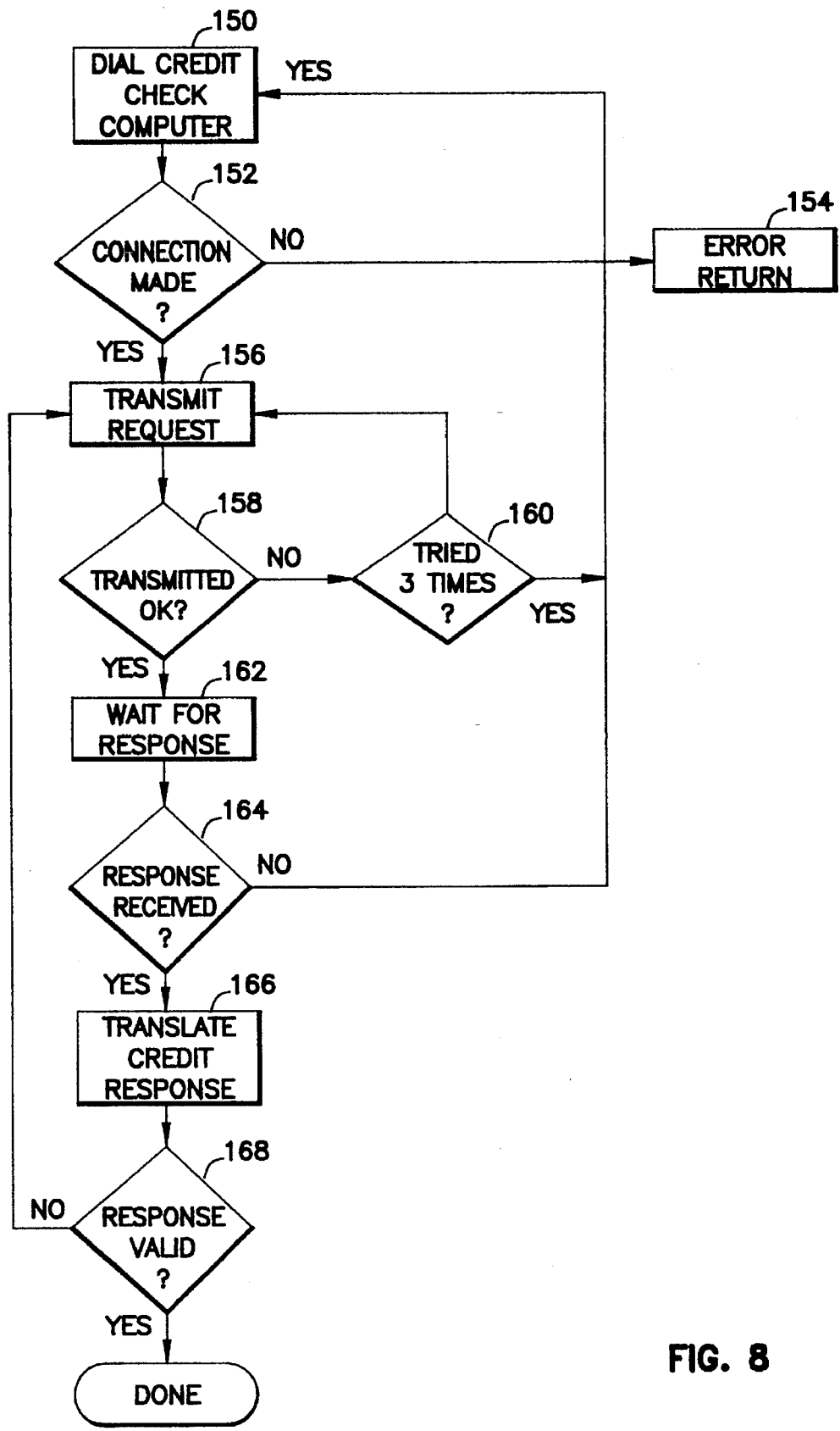
FIG. 8 is a flow chart representation of the steps taken in validating a credit card with a credit authorization computer.

At 358 a graphic is displayed showing the process of inserting or swiping a credit card. Card reader 16 notifies computer 24 that a card has been swiped and transfers the data encoded in the magnetic strip of the card. Computer 24 then initiates a call to credit authorization computer 62 for card validation as shown in FIG. 8 and explained below. Card validation is required before a certificate can be printed. In the preferred embodiment, card validation is handled as a separate, independent task. If a negative credit report is received from computer 62, at the next screen transition control moves to 354 where a list of forms of payment is again displayed and an opportunity is offered for the use of a different form of payment.

While the call is being made to computer 62, control moves to 360 where a request is displayed for the intended recipient's name. The customer touches "Yes" to indicate a name will be entered and control moves to 362. If "No" is selected control moves to 370 where a personal message can be entered on each certificate.

At 362 as shown in FIG. 10c the customer can enter the name of the intended recipient through touch screen 14 using a keyboard displayed on monitor 12. The typed name is displayed in a graphic of the completed gift certificate while the name is being entered. When the customer is finished entering the name, control moves to 364 where the customer can select a message to be printed on the gift certificate.

In an alternate embodiment, the customer can enter the name and address of the recipient at 362 and an envelope is printed bearing the address of the recipient.

At 364 a screen is displayed providing the opportunity to enter either a prepared message or a custom greeting. Selection of a prepared message is done by touching in the vicinity of the message displayed. Control then moves to 370. Selection of a custom message is done by touching the "Custom Message" label displayed on the screen of 364.

If a custom message is selected at 364, control moves to 368 where a keyboard is displayed for entering a custom message. When the message is completed control moves to 370 where a representation of certificate 200 is displayed along with the question "Is this correct?" and the labels "Yes" and "No". If the answer is "No" control moves to 372 where certificate 200 is displayed again along with the labels "Amount", "Greeting", "Names" and "Store". If "Amount" is selected control moves to 350 to change the type of certificate. If "Greeting" is selected control moves to 364 to change the message. If "Name" is selected control moves to 360 to change or delete the customer's or the recipient's name.

If, at 370, the certificate is deemed to be completed correctly the customer selects "Yes". If the card validation call has been completed and the charges authorized control moves to 376. If the card validation call has not been completed control moves to 374 and a screen is displayed showing that the credit check is still in progress. Control remains at 374 until the card validation call to computer 62 is completed. When the call is completed, if credit was not authorized, a message to that effect is displayed and control moves 354. If credit was authorized control moves to 376.

If, at 370, the certificate is deemed to be completed correctly the customer selects "Yes" and control moves to 374 where a signature capture routine is called so that the customer can enter a verification signature. Once the signature is completed and the card and charges validated by computer 60 via card authorization computer 62, control moves to 376. If the card validation call has not been completed control moves to 374 and a screen is displayed showing that the credit check is still in progress. Control remains at 374 until the card validation call to computer 62 is completed. When the call is completed, if credit was not authorized, a message to that effect is displayed and control moves 354. If credit was authorized control moves to 376.

At 376 the gift certificate is displayed and the customer is asked if the certificate should be printed. If the user selects "Print/Purchase", control moves to 378 where a signature capture routine is called so that the customer can enter a verification signature. Once the signature is completed control moves to 380 where an envelope is dispensed and an offer extended to purchase another certificate. If the answer is "Yes" control moves to 326. If "No" control moves to 382 where a brief "thank you" message is displayed before control moves back to 300 of the Attractor module of FIG. 9.

At any appropriate step of the main program there may be further program steps which allow for showing on the monitor screen advertisements of third parties. That is, such advertisements may be shown one or more times or different advertisements may be shown at different times between a starting time when the user first interacts with the touch screen and an ending time when the main program is completed as indicated at 382. In this regard, such advertisements may be shown on the main monitor, or there may be a second monitor also connected to the computer and therefore the user interface means so that advertisements may be shown at desired times on the second monitor while the main program is proceeding.

FIG. 11 illustrates the preferred embodiment of the "Browse" routine shown as 324 in FIG. 10a. The "Browse routine is entered at 390 where a series of visuals is displayed of retailer's logos and completed certificates. At 392 a short demonstration of a user purchasing a gift certificate is displayed. At 394 a graphic is displayed of a satisfied customer receiving a certificate. At 396 a statement listing the charges for purchasing a certificate is displayed along with a graphic demonstrating accumulation of charges on the receipt section of a completed gift certificate. And at 398 the customer is invited to create and display (but not print) a sample certificate. Control then moves back to the calling routine.

In a second embodiment of the main program, the screen displayed at 320 in FIG. 10a is modified to offer the customer the option of creating a gift certificate before committing to a purchase. ("Try Before Buy" vs. "Buy.") This option replaces the "Browse" and "How to Use the GCC" routines of the first embodiment. To clarify this option, a voice message is generated explaining that customers can go through all the steps of creating a gift certificate before they need to insert a credit card to complete the purchase. The selection of "Try" or "Buy" is saved before the routine moves to 320.

From 326, the main program follows the steps of FIGS. 10a and 10b until the routine reaches 358. There, if the "Try" option was chosen, step 358 is skipped and the routine moves directly from 356 to 360. The routine continues to 370. If, at 370, "Yes" is selected, and previously, "Try" was selected, the customer is offered the opportunity to insert a credit card and complete the purchase.

A series of routines used to perform functions within the main program are described next. A system shutdown routine used to secure a gift certificate dispensing device 10 is illustrated in FIG. 6. The routine is entered at 110 where computer 24 initiates display of an "Out of Order" screen on monitor 12. At 112 touch screen 14 is disabled and at 114, a call is placed through modem 42 to main computer 60 to log the reason for system shut down.

Figure 7:
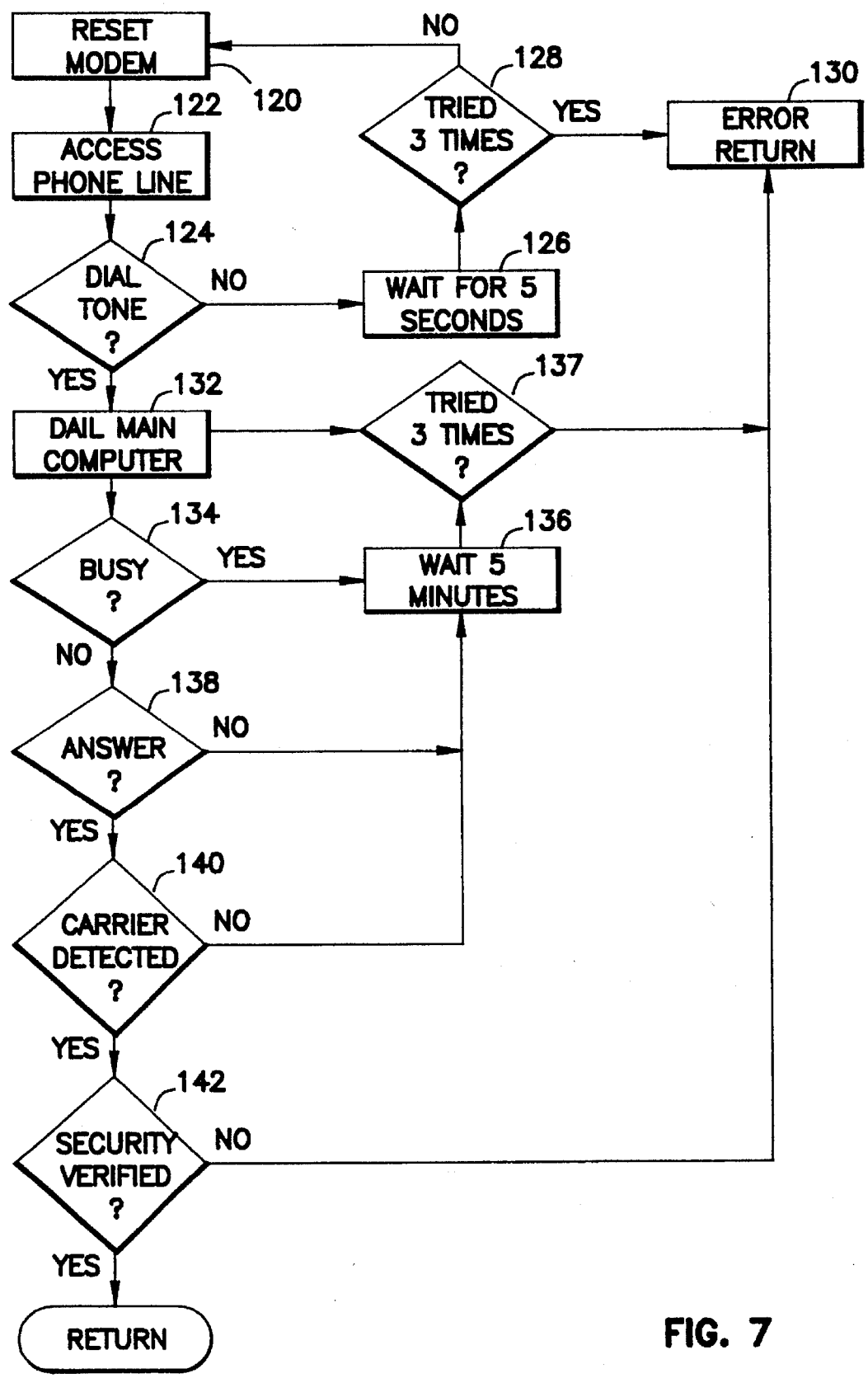
FIG. 7 is a flow chart representation of the steps taken in initiating a call to an external computer system.

A routine used to initiate a call to main computer 60 or credit card authorization computer 62 is shown in FIG. 7. For the sake of brevity the routine will be described for a call to computer 60. It should be obvious to one skilled in the art that this routine can be used to initiate a call to any external computer through modem 42. Also, this routine is used to set up the call; the calling routine takes over communicating to the external computer and terminates the call when ended. The routine is entered at 120 where modem 42 is set to a known condition. At 122 an attempt is made to access public telecommunications channel 46. At 124 computer 24 checks for a dial tone at modem 42. If a dial tone is not found, at 126 computer 24 increments the retry count, executes a program to wait for five seconds and checks to see at 128 if that was the third time a dial tone was not detected. If so, control moves to 130 and an error status is returned to the calling routine. If not, control moves to 120, modem 42 is again reset and the routine continues.

If a dial tone is found at 124, at 132 computer 24 commands modem 42 to dial computer 60. If at 134 a busy tone is detected, at 136 computer 24 initiates a program to wait five minutes and move to 137. If at 137 it is determined that this is the third failure, control moves to 130 and an error status is returned to the calling routine. If not, control moves to 132 to try the call again. If at 138 there is no answer after a predetermined number of rings or at 140 an off-hook is detected without a carrier, control moves to 136 to wait before trying again.

If a carrier is detected at 140, at 142 a security routine associated with computer 60 is executed. If the proper handshake is not consummated, control moves to 130 and an error status is returned to the calling routine. If security has been verified with the correct handshaking, control moves back to the calling routine to complete the call.

A routine used to validate a credit card swiped through card reader 16 is shown in FIG. 8. This routine is entered at 150 where a call is made to the routine shown in FIG. 7 to initiate the call. The routine shown in FIG. 7 returns with either a normal or an error status. If an error status is returned, at 152 control moves to 154 and an error status is returned to the routine that initiated the credit card validation routine.

If a normal status is returned on call initialization, at 152 control moves to 156 and a credit card validation request is transmitted to computer 62. If at 158, it is determined that the request was not transmitted correctly, at 160 a check is made to see if this is the third failure and, if not, control returns to 156 to try again. If at 160 it is determined that this is the third failure, control returns to 150 to initiate the call again.

If at 158 it is determined that the request was transmitted correctly, at 162 computer 24 waits a predetermined time period for a response. If the response is not received in that period of time at 164 control moves to 150 to initiate the call again.

If at 162 a response is received before expiration of the predetermined time period at 164 control moves to 166 where the response is translated into a format used by the program. At 168 the translated response is checked for validity. If the response is a valid response, control returns to the calling routine. If the response is not valid, control returns to 156 and the request is transmitted again.

Figure 15A:
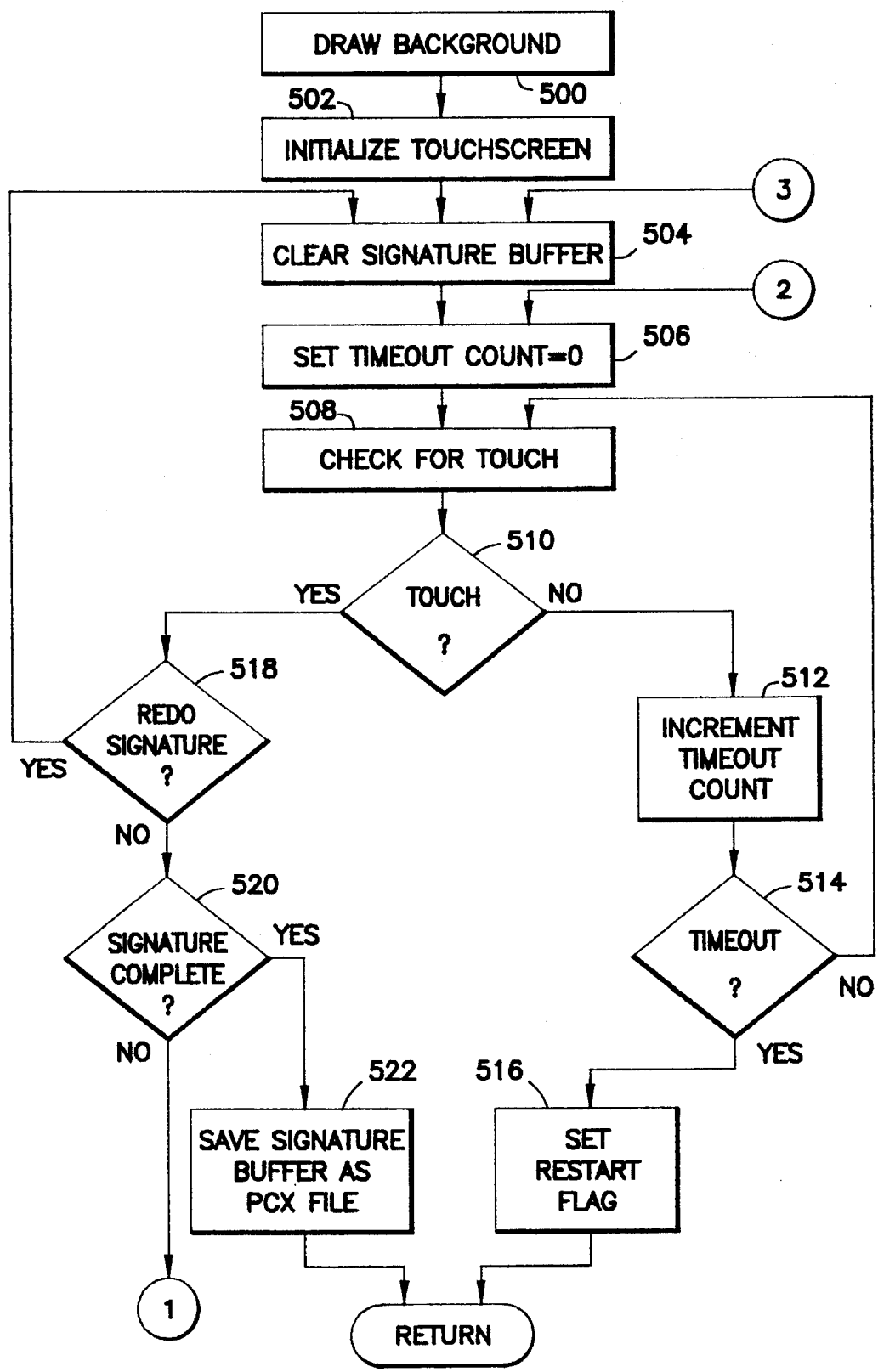
FIGS. 15a and 15b are flow chart representations of the steps taken in capturing a signature.
Figure 15B:
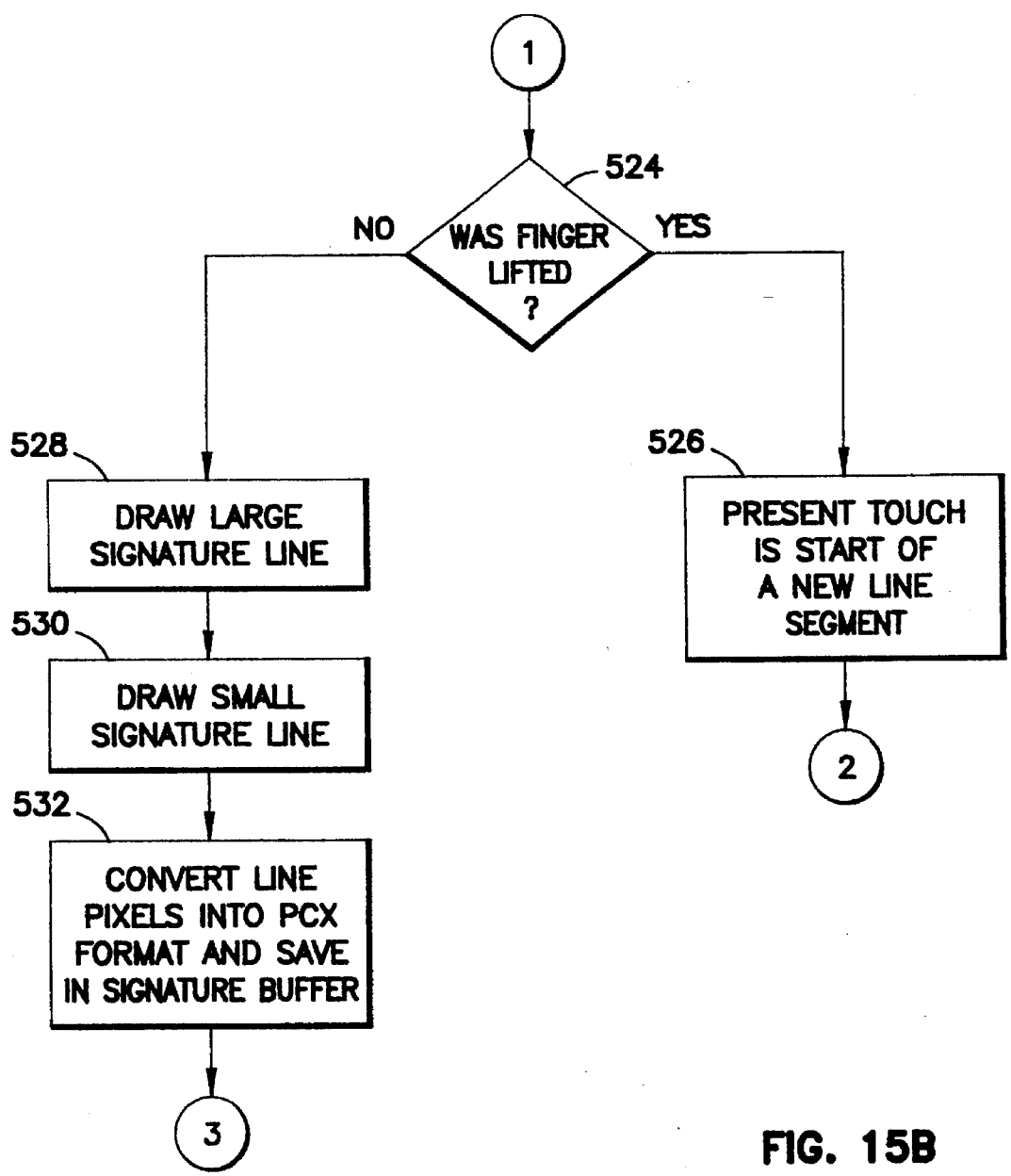

A routine used to capture a signature is shown in FIGS. 15a and 15b. In the preferred embodiment of the signature capture routine two signatures are displayed on the screen. The first, the large signature, traces the movement of the finger on the screen. The second, the small signature, is a reduced version of the large signature placed to show the signature as it will be printed to the gift certificate. The routine is entered at 500 where the background of the screen display is drawn. At 502, touchscreen 14 is initialized, at 504, a signature buffer cleared and, at 506, a timeout count variable is set to zero.

At 508, a check is made for a touch and if a touch is present, at 510 the program moves to 512 to increment the timeout count variable. At 514, a check is made to see if a predetermined timeout count has been reached. If not, control moves to 508 to check for a touch. If, at 514, it is determined that the predetermined timeout count has been reached, at 516, a flag is set to tell the main program to start over and control is returned to the main program.

If at 508 the check for touch determines a touch is present, at 518 a check is made to see if the touch is in the area of the touchscreen defined for user selection of the option to reenter the signature. If so, control moves to 504 where the signature buffer is cleared.

If at 518 it is determined that the touch was not in the area used to define the reenter signature function, at 520 a check is made to see if the touch is in the area of the touchscreen defined indicating the signature is complete. In the preferred embodiment, the signature is not considered to be complete until the customer indicates that by touching inside the area defined for indicating the signature is complete.

If at 520 it is determined that no touch occurred in the signature area, control moves to 524 where a determination is made as to whether there had been a break in the touching of touchscreen 14. If at 524 it is determined that there has been a break then control moves to 526 where the present touch is saved as the start of a new line segment and control then moves to 506.

If at 524 it is determined that no break occurred in contact of touchscreen 14, control moves to 528 where a line is drawn on monitor 12 from the previous touch point to the present touch point. Control then moves to 530 where a second line is drawn on monitor 12 from the point associated with the previous touch point to a point associated with the present touch point. The endpoints of the small signature line segments are chosen to scale the large signature line segment by a predetermined scale factor.

Once the line segment associated with the small signature is drawn at 530, control moves to 532 where the line pixels of the large signature line segment are converted to PCX format and saved to the signature buffer before control moves to 504.

In a second embodiment of the signature capture routine, a curve fitting algorithm could be used on the line segments to provide a smoother representation of the signature.

The present invention, as earlier indicated, is directed primarily to the dispensing of certificates negotiable for goods and services and has been disclosed primarily in terms of a preferred embodiment wherein gift certificates are dispensed. Another embodiment of the present invention includes dispensing a coupon along with a certificate. The coupon could be the third section, replacing the greeting portion of the gift certificate. In that fashion, the first section would be negotiable for goods and services. The second section would be a receipt. The third section would be a coupon. Alternatively, a coupon could be dispensed separately from the certificate. In either case, the main program would include steps to control when the user is eligible to receive the coupon. The main purpose of the coupon is to provide an incentive for the user to use the dispenser to obtain a certificate. The main program would include steps which would identify when the user has proceeded to a predetermined point in the main program so that the user is now eligible for a coupon. If the coupon were a third section to the certificate, and if it were not necessary for the user to proceed to the point of purchasing a certificate, the first two sections of the certificate would not be printed, while the user would still receive the entire document and be able to remove the third section for use as a coupon. If the coupon were supplied separate from the certificate, then whenever the user is eligible, the coupon could be appropriately dispensed. It is understood that the coupon may provide a discount on a future certificate or on goods and services from a designated retailer or group of retailers.

Still another embodiment of the present invention could include entering the user's name in a contest at a time when the user has proceeded to a certain point in the main program. Again, the main purpose of entry in the contest is to provide an incentive for the user to use the dispenser to obtain a certificate.

To use the present invention, the customer walks up to gift certificate dispensing device 10 and touches touch screen 14. The customer then selects a store from a list of local merchants or obtains a different list of merchants sorted by category or geographical area served. The customer next enters the type of credit card that will be used to purchase the gift certificate and swipes that card through card reader 16. While gift certificate dispensing device 10 is obtaining credit card authorization, the customer enters the name of the recipient of the card and chooses a personal message.

An image of the certificate with the name of the recipient and the personal message included is displayed for verification. If the certificate looks right the customer initiates printing of the certificate and, if the credit purchase was authorized, a gift certificate 200 is printed and dispensed through slot 18. At the same time an envelope is dispensed through slot 20.

The customer detaches section 202 from certificate 200 as a receipt for his records. The remaining certificate is folded at the intersection of sections 204 and 206, inserted in the envelope and mailed or given to the intended recipient. The charges detailed in section 202 are applied against the customer's charge account and appear sometime later in a normal credit card billing statement.

Although the present invention has been described with reference to the preferred embodiments, those skilled in the art will recognize that changes may be made in form and detail without departing from the spirit and scope of the invention.

What is claimed is:

1. A method of printing, under control of a user, from a certificate dispenser a negotiable certificate useful for obtaining goods and services, said dispenser including a computer, as well as display means, user interface means, payment means, and printing and dispensing means controlled by said computer, said method comprising the steps of:

displaying on said display means a menu of goods and services providers;

receiving from said user through said user interface means a choice of said goods and services providers;

displaying on said display means a series of monetary values;

receiving from said user through said user interface means a choice of one of said monetary values;

receiving with said payment means payment for said certificate from said user;

printing with said printing and dispensing means a certificate including the choice of the providers and the monetary value chosen; and dispensing said certificate.

2. The method in accordance with claim 1 wherein before said goods and services providers displaying step said method includes the steps of displaying a map and touching a point on the map to obtain a listing of providers located in a geographical region surrounding the point.

3. The method according to claim 1 including the step of mailing said certificate to a recipient, said certificate dispenser including means, under user control, for accepting and holding said certificate for subsequent delivery to a commercially known mail system.

* * * * *